United States Patent
Lee et al.

(10) Patent No.: US 10,516,182 B2
(45) Date of Patent: Dec. 24, 2019

(54) POLYMER ION EXCHANGE MEMBRANE AND METHOD OF PREPARING SAME

(71) Applicant: IUCF-HYU (Industry-University Cooperation Foundation Hanyang University), Seoul (KR)

(72) Inventors: Young Moo Lee, Seoul (KR); Chi Hoon Park, Seoul (KR); Doo Sung Hwang, Seoul (KR); So Young Lee, Seoul (KR); Dong Won Shin, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 1317 days.

(21) Appl. No.: 14/338,624

(22) Filed: Jul. 23, 2014

(65) Prior Publication Data
US 2014/0335439 A1 Nov. 13, 2014

Related U.S. Application Data

(63) Continuation-in-part of application No. 13/141,804, filed as application No. PCT/KR2010/005508 on Aug. 19, 2010, now abandoned.

(30) Foreign Application Priority Data

Aug. 21, 2009 (KR) .................. 10-2009-0077748
Aug. 17, 2010 (KR) .................. 10-2010-0079257
Mar. 26, 2014 (KR) .................. 10-2014-0035474

(51) Int. Cl.
*H01M 8/10* (2016.01)
*H01M 8/02* (2016.01)
(Continued)

(52) U.S. Cl.
CPC ......... *H01M 8/1053* (2013.01); *C08J 5/2256* (2013.01); *C08J 5/2287* (2013.01);
(Continued)

(58) Field of Classification Search
CPC . H01M 2008/1095; H01M 2300/0082; H01M 8/1025; H01M 8/1027;
(Continued)

(56) References Cited

U.S. PATENT DOCUMENTS

2001/0038937 A1    11/2001  Suzuki
2002/0001744 A1*    1/2002  Tsusaka .................. C08J 5/2256
                                                              429/481
(Continued)

FOREIGN PATENT DOCUMENTS

KR    10-2000-0039319    7/2000
KR    10-2006-0134197    12/2006
(Continued)

OTHER PUBLICATIONS

Xing et al., Improved performance of sulfonated polyarylene ethers for proton exchange membrane fuel cells, 2006, Polymers for Advanced Technologies, 17: 591-597 (Year: 2006).*

*Primary Examiner* — Adam A Arciero
(74) *Attorney, Agent, or Firm* — Lex IP Meister, PLLC

(57) ABSTRACT

Disclosed are a polymer ion exchange membrane having a self-hydration capability at a high temperature under low humidity, a method of preparing the polymer ion exchange membrane, and a polymer electrolyte fuel cell system including the polymer ion exchange membrane. The polymer electrolyte membrane includes a hydrocarbon-based proton conductive polymercoating layer, and has a nano-crack on the hydrophobic surface and thus may secure ion (Continued)

conductivity and self-hydration capability under low humidity and remarkably improve electrochemical performance of an electrolyte.

6 Claims, 34 Drawing Sheets

(51) Int. Cl.
| | |
|---|---|
| C08J 5/22 | (2006.01) |
| H01M 8/1053 | (2016.01) |
| H01M 8/1065 | (2016.01) |
| C08J 7/12 | (2006.01) |
| H01M 8/1086 | (2016.01) |
| H01M 8/1018 | (2016.01) |
| H01M 8/1025 | (2016.01) |
| H01M 8/1027 | (2016.01) |
| H01M 8/1032 | (2016.01) |

(52) U.S. Cl.
CPC .......... *C08J 7/123* (2013.01); *H01M 8/1065* (2013.01); *H01M 8/1086* (2013.01); *C08J 2381/06* (2013.01); *H01M 8/1025* (2013.01); *H01M 8/1027* (2013.01); *H01M 8/1032* (2013.01); *H01M 2008/1095* (2013.01); *H01M 2300/0082* (2013.01); *Y02P 70/56* (2015.11)

(58) Field of Classification Search
CPC ............. H01M 8/1032; H01M 8/1053; H01M 8/1065; H01M 8/1086
See application file for complete search history.

(56) References Cited

U.S. PATENT DOCUMENTS

| | | | |
|---|---|---|---|
| 2004/0180250 A1* | 9/2004 | Nanaumi | ............... C08J 5/2256 429/413 |
| 2005/0255373 A1 | 11/2005 | Kimura et al. | |
| 2007/0054163 A1* | 3/2007 | Hammerschmidt | ........................ H01M 8/0206 429/470 |
| 2007/0141580 A1 | 6/2007 | David | |
| 2009/0166579 A1* | 7/2009 | Kawahara | ............. H01B 1/122 252/182.1 |
| 2010/0151350 A1* | 6/2010 | Fujinami | ................ H01B 1/122 429/483 |

FOREIGN PATENT DOCUMENTS

| | | |
|---|---|---|
| KR | 10-2007-0024967 | 3/2007 |
| KR | 10-2007-0090556 | 9/2007 |
| KR | 10-2007-0106199 | 11/2007 |

* cited by examiner

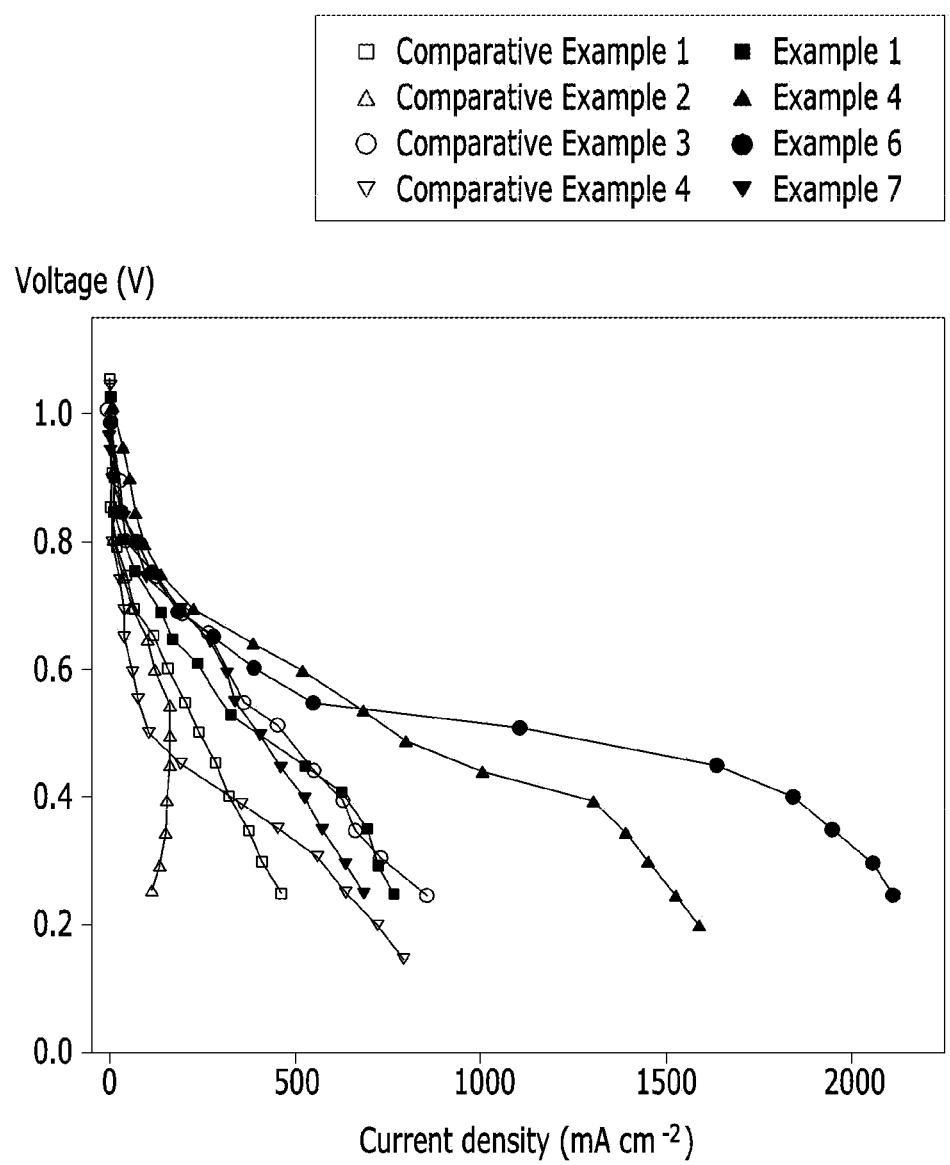

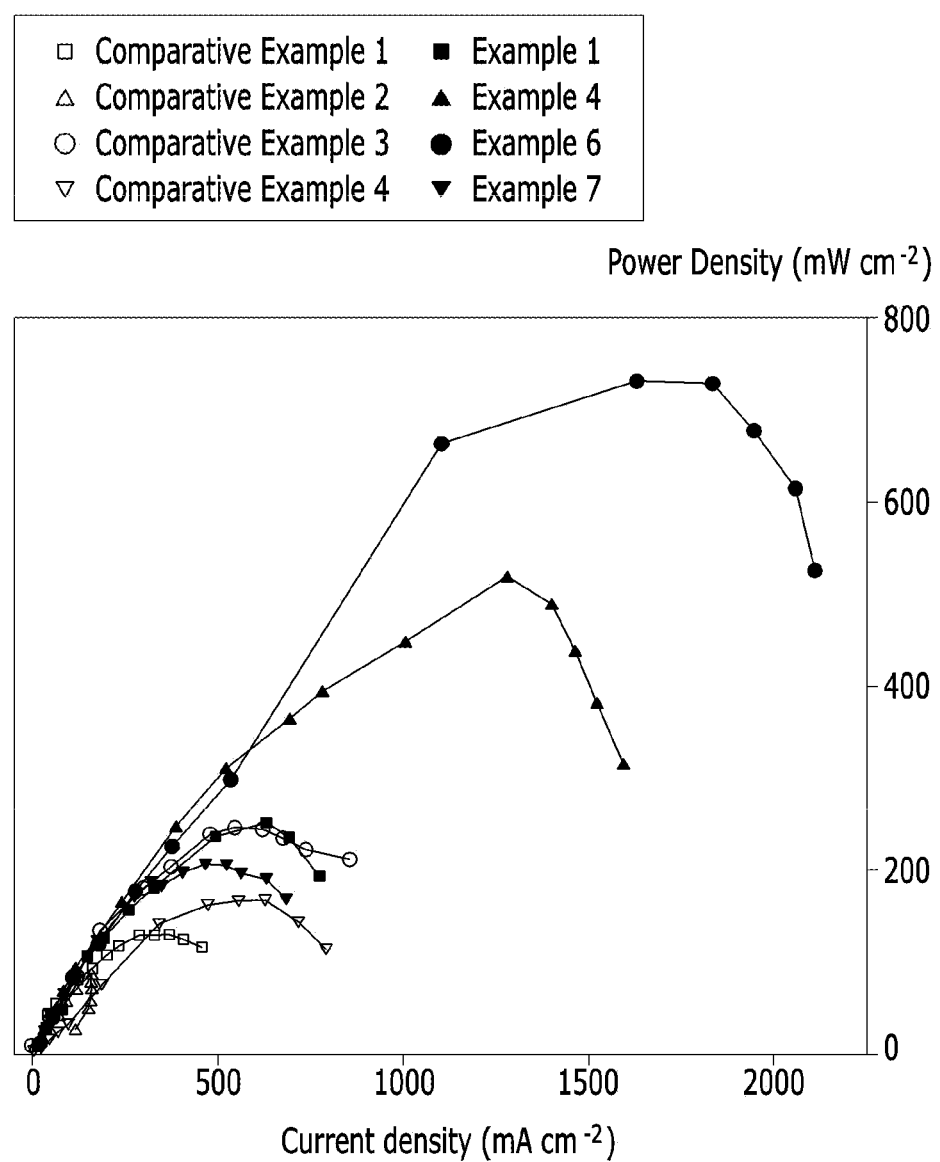

POLYMER ION EXCHANGE MEMBRANE AND METHOD OF PREPARING SAME

CROSS-REFERENCE TO RELATED APPLICATION

This application claims priority under 35 U.S.C. § 119 to Korean Application No. 10-2014-0035474, filed on Mar. 26, 2014, the entire contents of which are incorporated herein by reference.

This application is a continuation-in-part of U.S. patent application Ser. No. 13/141,804, filed in the United States Patent and Trademark Office on Jun. 23, 2011, which claims priority to and the benefit of Korean Patent Application Nos. 10-2009-0077748 and 10-2010-0079257 filed in the Korean Intellectual Property Office on Aug. 21, 2009 and Aug. 17, 2010, the entire contents of which are incorporated herein by reference.

BACKGROUND OF THE INVENTION (a) Field of the Invention

This disclosure relates to a polymer ion exchange membrane having self-hydration capability under low humidity conditions, and a method of preparing the same.

(b) Description of the Related Art

A fuel cell is a power generation system for producing electrical energy through the electrochemical redox reaction of an oxidant and hydrogen included in a hydrocarbon-based material such as methanol, ethanol, natural gas, and the like.

Such a fuel cell is a clean energy source that can replace fossil fuels. It includes a stack composed of unit cells, and has an advantage of producing various ranges of power. Since it has a four to ten times higher energy density than a small lithium cell, it has been high-lighted as a small portable power source.

Typical examples of a fuel cell are a polymer electrolyte membrane fuel cell (PEMFC) and a direct oxidation fuel cell (DOFC). The direct oxidation fuel cell which uses methanol as a fuel is called a direct methanol fuel cell (DMFC).

In a fuel cell, the stack that actually generates electricity includes several to scores of unit cells stacked in multiple layers. Each unit cell is made up of a membrane-electrode assembly (MEA) and a separator (also referred to as a bipolar plate). The membrane-electrode assembly has an anode (referred to as a fuel electrode or an oxidation electrode), a cathode (referred to as an air electrode or a reduction electrode), and a polymer electrolyte between the anode and the cathode, and the polymer electrolyte membrane is attached to the anode and the cathode through a proton ion conductive binder.

Electricity in a fuel cell is generated as follows: a fuel is supplied to an anode and adsorbed in catalysts of the anode, and then oxidized to produce protons and electrons. The electrons are transferred into the cathode, an oxidizing electrode, via an electric conductive external circuit, while the protons are transferred into the polymer electrolyte membrane through a proton conductive binder by passing through the polymer electrolyte membrane including a proton conductive polymer, and then through a proton conductive binder, and reach the cathode. In addition, an oxidant is supplied to the cathode. Then, the oxidant, protons, and electrons are reacted on catalysts of the cathode to produce electricity along with water.

It is important for a fuel cell stack system used for vehicle transportation and the like to maintain the membrane-electrode assembly in a hydrated state to secure sufficient ion conductivity, and thus requires additional fuel humidifying and cooling apparatuses.

SUMMARY OF THE INVENTION

One embodiment of the present invention provides a polymer ion exchange membrane having a self-hydration capability under low humidifying conditions, and thus improving performance of a fuel cell.

Another embodiment of the present invention provides a method of preparing the polymer ion exchange membrane.

The polymer ion exchange membrane according to one embodiment of the present invention includes a hydrocarbon-based proton conductive polymer film, with a surface that has a crack and is hydrophobic.

The crack may be 5 nm to 1000 nm deep and 5 nm to 500 nm wide.

The polymer ion exchange membrane may have a surface contact angle of greater than or equal to 70° and less than or equal to 180°, or greater than or equal to 70° and less than or equal to 120°.

The polymer ion exchange membrane further includes a hydrophobic thin coating layer on the surface. The hydrophobic thin film may be 1 nm to 1000 nm thick. In addition, the hydrophobic thin film may include a hydrophobic functional group such as $-CF_2-$, $-CF_3$, or a combination thereof.

When the surface of the polymer on exchange membrane is measured by using X-ray photoelectron spectroscopy (XPS), peaks may be shown at bonding energy of 670 eV to 700 eV, and 280 eV to 300 eV.

When the central portion of the polymer ion exchange membrane is measured with FT-IR, multiplet peaks may be shown at 500 cm$^{-1}$ to 1500 cm$^{-1}$.

The hydrocarbon-based proton conductive polymer is a polymer having a proton conductive group. The polymer may be a hydrocarbon-based polymer selected from the group consisting of a benzimidazole-based polymer, a benzoxazole-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer, a copolymer thereof, and a combination thereof.

The hydrocarbon-based proton conductive polymer may include a hydrocarbon-based polymer including a first repeating unit represented by the following Chemical Formula 1 and a second repeating unit represented by the following Chemical Formula 2.

[Chemical Formula 1]
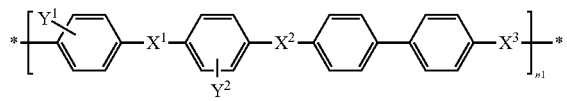

[Chemical Formula 2]
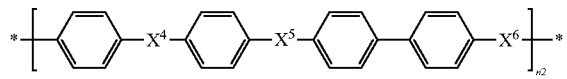

In the above Chemical Formulae 1 and 2,
$X^1$, $X^2$, $X^3$, $X^4$, $X^5$, and $X^6$ are the same or different from each other, and are $SO_2$ or O,
$Y^1$ and $Y^2$ are $SO_3H$ or $SO_3Na$,
n2 is 100-n1, and n1 is 30 to 70.

The hydrocarbon-based proton conductive polymer may include a hydrocarbon-based polymer represented by the following Chemical Formula 3.
[Chemical Formula 3]
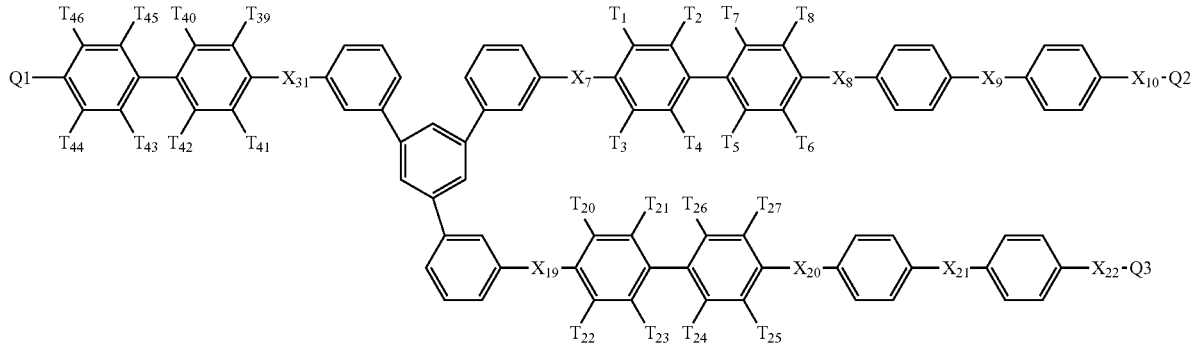
In the above Chemical Formula 3,
Q1 is represented by Chemical Formula 3a,
[Chemical Formula 3a]
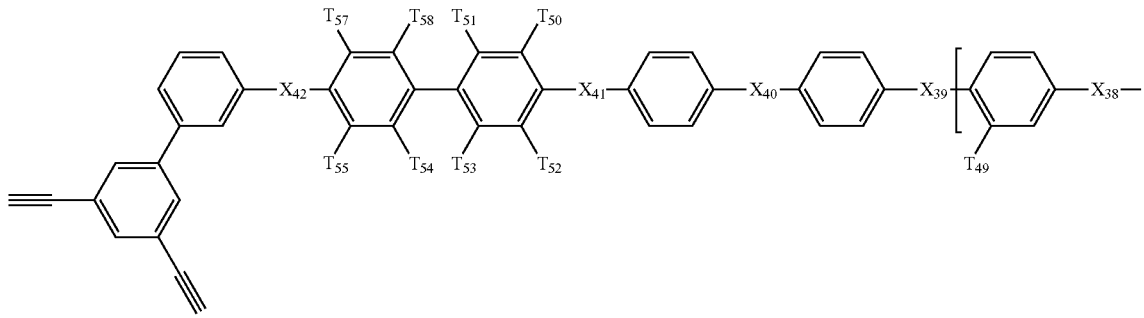
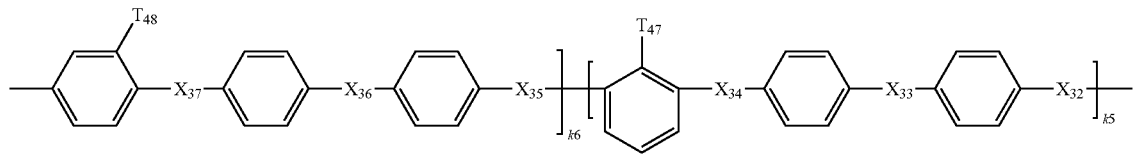
Q2 is represented by Chemical Formula 3b,
[Chemical Formula 3b]
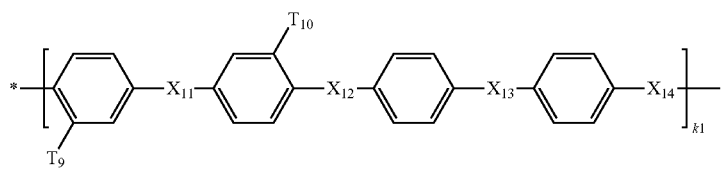

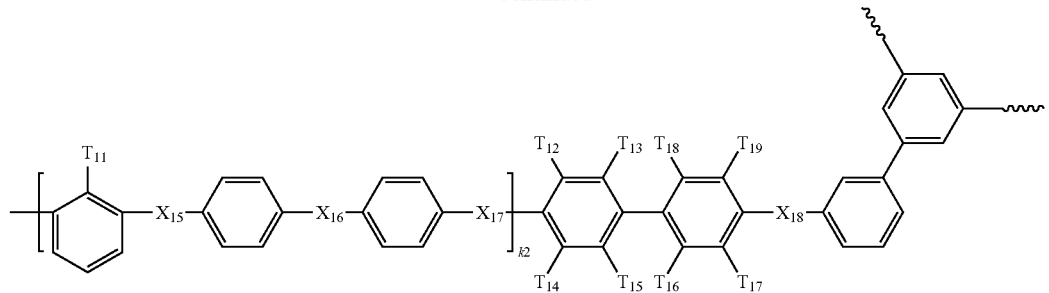

Q3 is represented by Chemical Formula 3c,

[Chemical Formula 3c]

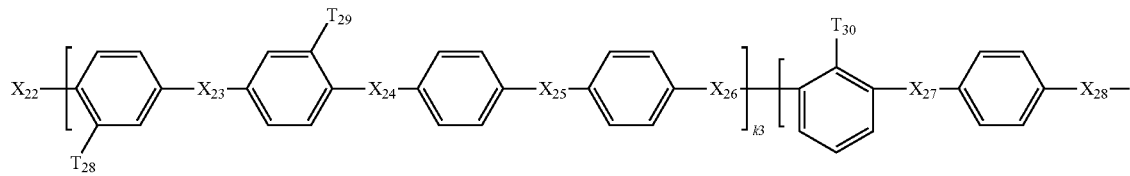

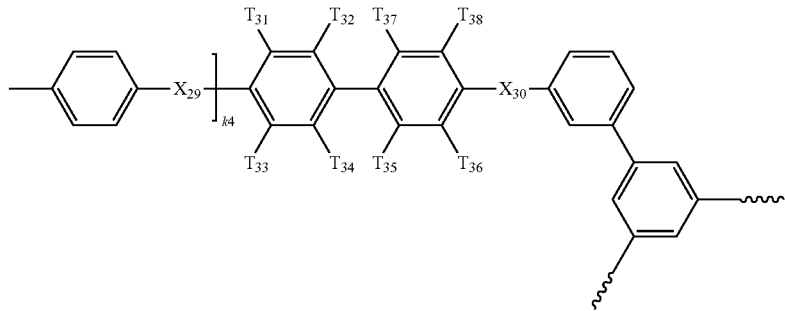

In Chemical Formulas 3a, 3b and 3c, $X^7, X^8, X^9, X^{10}, X^{11}, X^{12}, X^{13}, X^{14}, X^{15}, X^{16}, X^{17}, X^{18}, X^{19}, X^{20}, X^{21}, X^{22}, X^{23}, X^{24}, X^{25}, X^{26}, X^{27}, X^{28}, X^{29}, X^{30}, X^{31}, X^{32}, X^{33}, X^{34}, X^{35}, X^{36}, X^{37}, X^{38}, X^{39}, X^{40}, X^{41},$ and $X^{42}$ are the same or different from each other, and are S, O or $SO_2$, $X^{11}, X^{23}, X^{38}$ is sulfone ($-SO_2-$).

$X^7, X^{18}, X^{19}, X^{30}, X^{31},$ and $X^{42}$ are ether linkage ($-O-$)

$T^1, T^2, T^3, T^4, T^5, T^6, T^7, T^8, T^9, T^{10}, T^{11}, T^{12}, T^{13}, T^{14}, T^{15}, T^{16}, T^{17}, T^{18}, T^{19}, T^{20}, T^{21}, T^{22}, T^{23}, T^{24}, T^{25}, T^{26}, T^{27}, T^{28}, T^{29}, T^{30}, T^{31}, T^{32}, T^{33}, T^{34}, T^{35}, T^{36}, T^{37}, T^{38}, T^{39}, T^{40}, T^{41}, T^{42}, T^{43}, T^{44}, T^{45}, T^{46}, T^{47}, T^{48}, T^{49}, T^{50}, T^{51}, T^{52}, T^{53}, T^{54}, T^{55}, T^{56}, T^{57},$ are the same or different from each other F, CN or $SO_3H$, $T^9, T^{10}, T^{28}, T^{29}, T^{48},$ and $T^{49},$ are sulfuric acid groups ($-SO_3H$), $T^9, T^{10}, T^{28}$ are nitrile groups ($-CN$), k1, k3, and k5 are the same or different from each other (hydrophilic part) and an integer of 0.4 to 0.6. k2, k4, and k6 are 1-k1, 1-k3, and 1-k5 (hydrophobic part), which are the same or different from each other, and an integer of 0.6 to 0.4. For example, if k1, k3, k5 are 0.6, k2, k4, k6 of 0.4) The hydrocarbon-based proton conductive polymer may include a hydrocarbon-based polymer represented by following Chemical Formula 4.

[Chemical Formula 4]

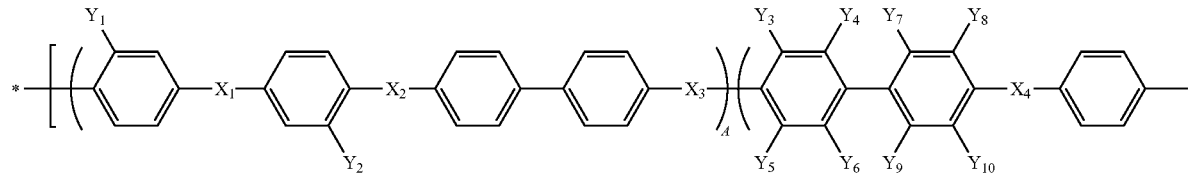

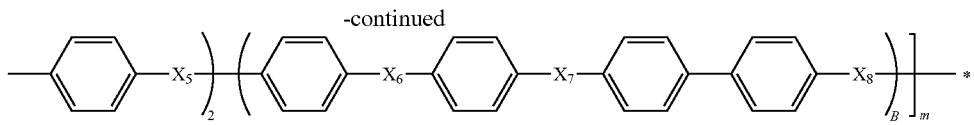

In the above Chemical Formula 4, $X_1$, $X_2$, $X_3$, $X_4$, $X_5$, $X_6$, $X_7$ and $X_8$ are the same or different from each other and are $SO_2$, or O, $Y_1$ and $Y_2$ are $SO_3H$ or $SO_3Na$, $Y_3$, $Y_4$, $Y_5$, $Y_6$, $Y_7$, $Y_8$, $Y_9$, and $Y_{10}$ are F A is an integer of 5 to 30, which means the chain length of hydrophilic oligomer from 5 kg/mol to 15 kg/mol, B is an integer of 10 to 40, which means the chain length of hydrophobic oligomer from 5 kg/mol to 15 kg/mol and m is an integer of 2 to 20 when molecular weight of multiblock copolymer is in range from 50 kg/mol to 200 kg/mol.

The polymer ion exchange membrane may be used as a polymer electrolyte membrane for a fuel cell.

According to another embodiment of the present invention, a method of preparing the polymer ion exchange membrane to have a hydrophobic surface by treating the hydrocarbon-based proton conductive polymer by using plasma 10 times to 40 times is provided.

Herein, the hydrophobic treatment using plasma may be performed by blowing in a first gas selected from the group consisting of argon gas, nitrogen gas, oxygen gas, helium gas, or a combination thereof, and a second gas selected from the group consisting of a hydrocarbon gas, a fluorocarbon gas, or a combination thereof.

The hydrocarbon gas may be $CH_4$ or $C_2H_2$, and the fluorocarbon gas may be $C_4F_8$, $CF_4$, or a combination thereof.

According to yet another embodiment of the present invention, the plasma treatment may be performed by blowing in a first gas selected from the group consisting of argon, nitrogen, oxygen, helium, and a combination thereof, and a second gas selected from the group consisting of $CF_4$ gas, $C_4F_8$ gas, and a combination thereof.

Therefore, the present invention may provide a polymer ion exchange membrane that maintains internal moisture content and has dimensional stability and simultaneously improves physical properties of a fuel cell, and also increases a junction with a binder, particularly a junction with a commercially available fluorine-based binder, and thus improves electrochemical performance and long-term performance of a membrane-electrode assembly.

BRIEF DESCRIPTION OF THE DRAWINGS

FIG. 27A is a graph showing current density of the polymer electrolyte membranes according to Examples 1, 4, 6 and 7 and Comparative Examples 1 to 4 under relative humidity of 35% at 120° C.

FIG. 27B is a graph showing power density of the polymer electrolyte membranes according to Examples 1, 4, 6 and 7 and Comparative Examples 1 to 4 under relative humidity of 35% at 120° C.

DETAILED DESCRIPTION OF THE INVENTION

Figure 1:
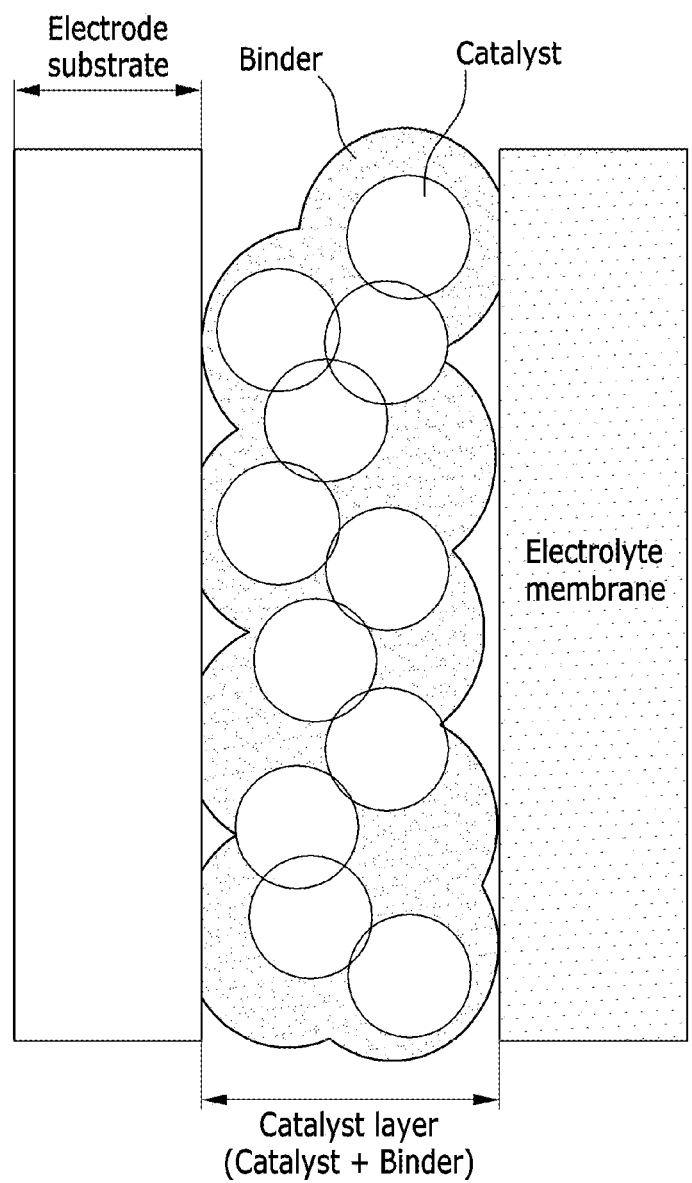
FIG. 1 provides a drawing illustrating the junction of an electrode with a polymer electrolyte membrane according to one embodiment of the present invention.

Hereinafter, embodiments of the present invention are described in detail. However, these embodiments are exemplary, and this disclosure is not limited thereto.

One embodiment of the present invention provides a polymer ion exchange membrane formed of a hydrocarbon-based proton conductive polymer. The polymer on exchange membrane has a crack on the surface, and the surface is hydrophobic.

The crack may be 5 nm to 1000 nm deep or 5 nm to 500 nm deep. In addition, the crack may be 5 nm to 500 nm wide. When the polymer on exchange membrane is hydrated, the crack may be 5 nm to 250 nm deep and 5 nm to 400 nm wide. When the crack on the polymer on exchange membrane has a depth out of the range, the moisturizing ability of the polymer on exchange membrane may be not maintained or the crack may hinder movement of hydrated ions even though the moisturizing ability of the polymer ion exchange membrane is maintained, and thus deteriorates ion conductivity.

When the ion exchange membrane absorbs water and is swelled, an open water channel which is the widened gap between the cracks, is formed depending on an swelling ratio of the ion exchange membrane, and when the hydrated +ion exchange membrane is dry, the gap among the cracks becomes smaller and closes the open water channel and thus may delay dehydration speed and hold water without completely drying the water inside the ion exchange membrane. In this way, since the water is partially stored inside the ion exchange membrane, ions may be effectively transferred through the ion exchange membrane at middle and high temperatures under low humidity. Accordingly, the ion exchange membrane according to one embodiment of the present invention may be a self hydration system ion exchange membrane.

The ion exchange membrane according to the present invention may be used as a polymer electrolyte membrane for a fuel cell particularly under low humidity, and also a condition of high temperature and low humidity. When this self hydration system electrolyte membrane is used for a low humidifying fuel cell, the self hydration system electrolyte membrane absorbs water generated from an oxidation reduction reaction of a fuel cell and internally stores the water, and thus may maintain excellent ion conductivity at a high temperature under low humidity where a dry environment is maintained during operation.

The polymer ion exchange membrane may have a surface contact angle of greater than or equal to 70° and less than or equal to 180°, greater than or equal to 70° and less than or equal to 120°, or greater than or equal to 70° and less than or equal to 115°. In addition, the polymer ion exchange membrane may have a surface contact angle of greater than or equal to 80° and less than or equal to 180°, greater than or equal to 80° and less than or equal to 120°, or greater than or equal to 80° and less than or equal to 115°.

When a polymer ion exchange membrane has a surface contact angle of 70° to 90°, the polymer ion exchange membrane may be weakly hydrophobic.

When the polymer ion exchange membrane includes a hydrophilic area in a high ratio and thus has a contact angle of less than or equal to 70° and is hydrophilic, the polymer electrolyte membrane may be extremely swelled during hydration and detached from a catalyst layer including a binder.

When the polymer ion exchange membrane according to one embodiment of the present invention is used as a polymer electrolyte membrane for a fuel cell, surface contact angle of the polymer ion exchange membrane may be adjusted to be 70° to 180° to relatively increase hydrophobicity on the surface, and in addition, properties of the polymer ion exchange membrane may be adjusted to be similar to those of the binder used in the catalyst layer of a fuel cell, and accordingly, the polymer ion exchange membrane may have an enhanced attachment with the catalyst layer of an anode and a cathode. Accordingly, the enhanced attachment may become maximized when a fluorine-based binder is used. A binder is included in a catalyst layer and makes a junction of the catalyst of an anode and a cathode with a polymer electrolyte membrane. Since a generally-used binder is a fluorinated resin and is hydrophobic, compatibility of a catalyst layer and the surface of a polymer electrolyte membrane is further improved, and thus the attachment therewith is also improved when the polymer electrolyte membrane has hydrophobicity. In this way, when the catalyst layer of an electrode has an enhanced attachment with a polymer electrolyte membrane, a fuel cell may have improved long-term stability.

In the present invention, a surface indicates a depth from the outermost surface of a polymer electrolyte membrane (a surface contacting an anode or a cathode) to about 10% of the entire thickness of the polymer electrolyte membrane based on 100% of the entire thickness of the polymer electrolyte membrane in a depth direction (toward an opposing electrode). However, the surface may indicate about 5% of the depth from the outermost surface of the polymer electrolyte membrane.

In other words, a polymer electrolyte membrane according to one embodiment of the present invention may be controlled to have a hydrophobic surface property (e.g., weakly hydrophobic or superhydrophobic) but maintain internal properties. When a polymer electrolyte membrane has the same hydrophobic internal property as the surface, distribution of hydrophilic ion transfer channels may be prevented and thus proton conductivity may be deteriorated.

In the present invention, the polymer electrolyte membrane has a hydrophobic property on the surface but maintains its own property inside, as determined by measuring XPS on the surface and FT-IR of the inside, that is, the core of the polymer electrolyte membrane.

In other words, when the XPS is measured on the surface of the polymer electrolyte membrane according to one embodiment of the present invention, peaks may be shown at bonding energy of 670 eV to 700 eV and 280 eV to 300 eV. The peak at bonding energy of 670 eV to 700 eV is caused by a fluorine element in a coating layer, and specifically, the peak may be shown at bonding energy of 677 eV to 697 eV. In addition, the peak at the bonding energy of 280 eV to 300 eV is caused by a fluorocarbon such as —CF$_3$ or —CF$_2$—, and specifically, the peak may be shown at bonding energy of 287 eV to 295 eV and caused by fluorocarbon formed by a plasma treatment in a process of preparing the polymer ion exchange membrane. However, when the FT-IR is measured to analyze the central portion of the polymer electrolyte membrane, no sorption band corresponding to a fluorine bond found at 1100 cm$^{-1}$ to 1300 cm$^{-1}$ and no change of multiplet peak found at 500 cm$^{-1}$ to 1500 cm$^{-1}$ show that the polymer electrolyte membrane has no internal polymer chain structure change.

The polymer electrolyte membrane may have a surface contact angle 70° to 180° where it contacts an electrode. In addition, the polymer electrolyte membrane according to one embodiment of the present invention may have a surface contact angle of 70° to 120° or 70° to 115°. Furthermore, the polymer electrolyte membrane according to one embodiment of the present invention may have a surface contact angle of 80° to 180°, 80° to 120°, or 80° to 115°.

When the polymer electrolyte membrane has a surface contact angle ranging from 70° to 180°, it may have an excellent attachment with a binder used in a catalyst layer, and particularly an excellent junction with a generally-used fluorine-based binder, and thus may decrease interface resistance against an electrode. In addition, the polymer electrolyte membrane has improved dimensional stability and thus may be less peeled off from the catalyst layer including a binder, resultantly improving electrochemical performance and long-term stability.

The polymer electrolyte membrane may further include a hydrophobic thin film on the surface. The hydrophobic thin coating layer includes a hydrophobic functional group such as —CF$_2$—, —CF$_3$, or a combination thereof, and this hydrophobic functional group may secure compatibility on the surface with a fluorine-based binder. The hydrophobic thin coating layer may also include a proton conductive group such as —SO$_3$H.

The hydrophobic thin coating layer may have the same thickness as depth of a crack, for example, a thickness of 1 nm to 1000 nm. When the hydrophobic thin coating layer has a thickness out of the range, no effect of forming the hydrophobic thin coating layer is obtained or ion movement from the inside to the outside or from the outside or the inside is hindered, and thus the polymer ion exchange membrane may have high resistance without sufficient ion conductivity.

The hydrocarbon-based proton conductive polymer may include any hydrocarbon-based polymer resin with proton conductivity, and in particular, all hydrocarbon-based polymer resins having a cation exchange group selected from the group consisting of a sulfonic acid group, a carboxylic acid group, a phosphoric acid group, a phosphonic acid group, and derivatives thereof at the side chain. Examples of the polymer may include a hydrocarbon-based polymer selected from a benzimidazole-based polymer, a benzoxide-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, a polyphenylquinoxaline-based polymer, a copolymer thereof, or a combination thereof.

Examples of the polymer resin may include at least one selected from polyetheretherketone, polypropylene oxide, a polyacrylic acid ionomer, polyarylene ether sulfone, sulfonated polyarylene ether sulfone, sulfonated polyether ether ketone, sulfonated polyphosphazene, sulfonated poly arylene sulfide, polybenzoxazole, poly(2,2'-m-phenylene)-5,5'-bibenzimidazole, and poly(2,5-benzimidazole). The polymer resin has the aforementioned cation exchange group at the side chain.

The polymer resin may be a hydrocarbon-based polymer including a first repeating unit represented by the following Chemical Formula 1 and a second repeating unit represented by the following Chemical Formula 2.

[Chemical Formula 1]

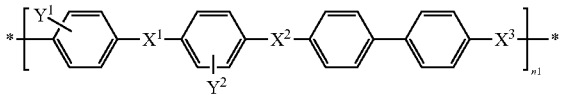

[Chemical Formula 2]

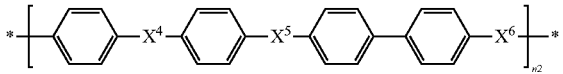

In the above Chemical Formulae 1 and 2, $X^1$, $X^2$, $X^3$, $X^4$, $X^5$, and $X^6$ are the same or different from each other and are SO$_2$ or O, $Y_1$ and $Y_2$ are SO$_3$H or SO$_3$Na, n2 is 100-n1, and n1 is an integer of 30 to 70, or an integer of 40 to 60. In the above Chemical Formula 1, when n1 and n2 are included within the range, an ion conductive polymer includes a sufficient hydrophilic ion channel area and secures high ion conductive and electrochemical properties, and accordingly, morphology and hydrophobicity on the surface of the electrolyte membrane may be adjusted through various plasma hydrophobic coatings. According to one embodiment of the present invention, the hydrophobic treatment on the surface of a polymer electrolyte membrane may work better with a hydrocarbon-based polymer than a fluorine-based polymer as a proton conductive polymer.

In one embodiment, the polymer resin may be a hydrocarbon-based polymer represented by the following Chemical Formula 3.

[Chemical Formula 3]

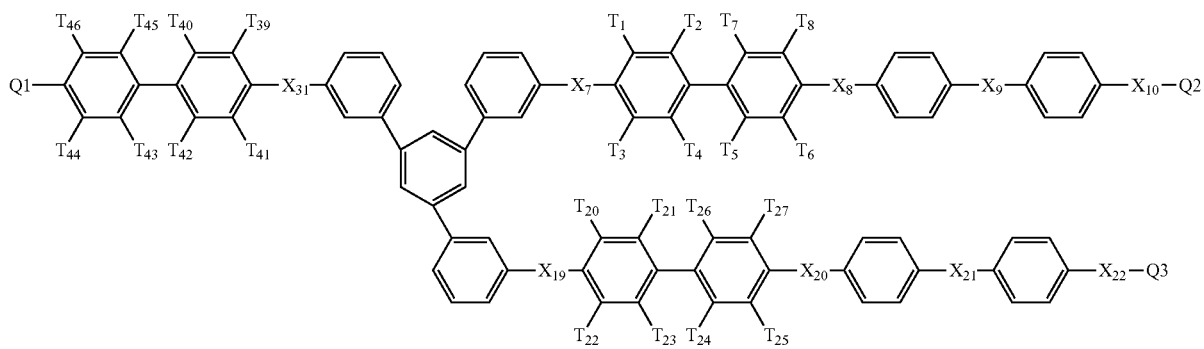

[Chemical Formula 3]

In the above Chemical Formula 3,
Q1 is represented by Chemical Formula 3a,

[Chemical Formula 3a]

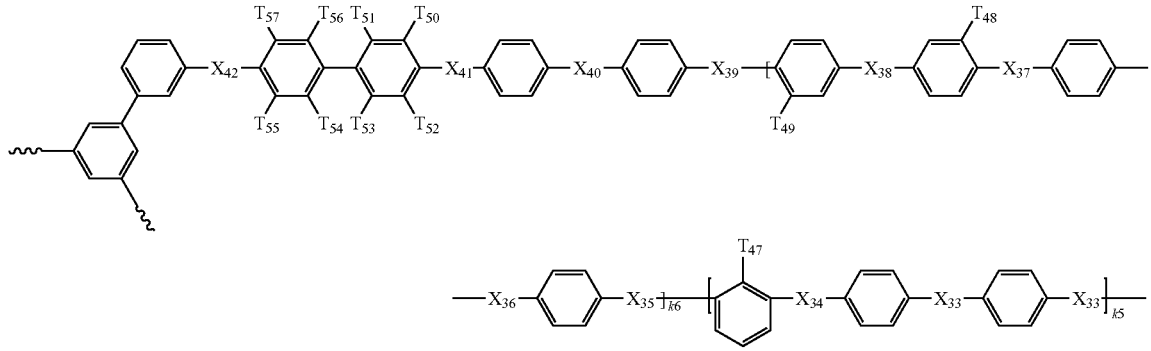

Q2 is represented by Chemical Formula 3b,

[Chemical Formula 3b]

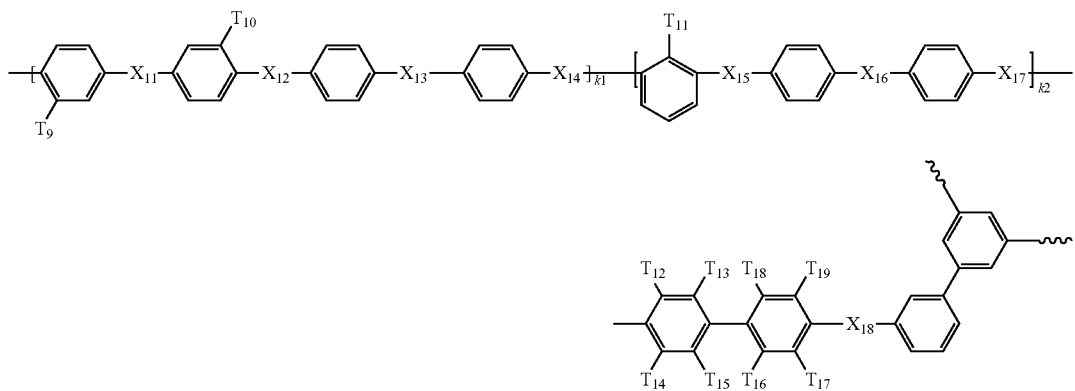

Q3 is represented by Chemical Formula 3c,

[Chemical Formula 3c]

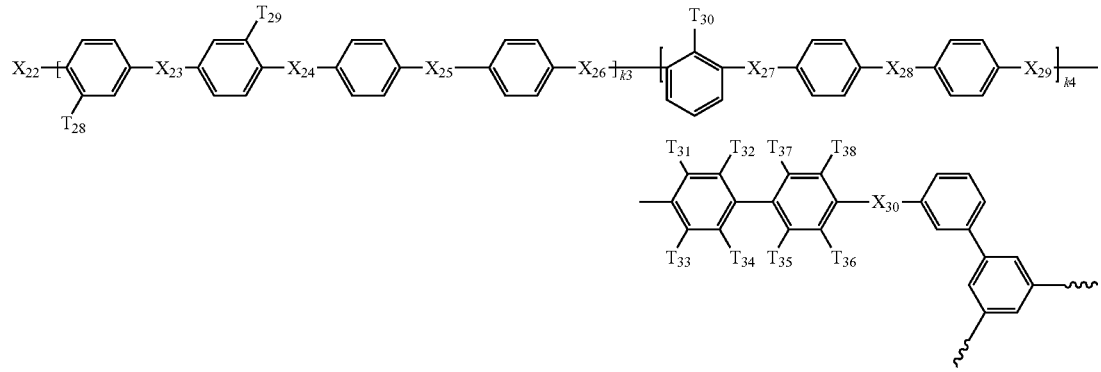

In Chemical Formulas 3a, 3b and 3c,
$X^7$, $X^8$, $X^9$, $X^{10}$, $X^{11}$, $X^{12}$, $X^{13}$, $X^{14}$, $X^{15}$, $X^{16}$, $X^{17}$, $X^{18}$, $X^{19}$, $X^{20}$, $X^{21}$, $X^{22}$, $X^{23}$, $X^{24}$, $X^{25}$, $X^{26}$, $X^{27}$, $X^{28}$, $X^{29}$, $X^{30}$, $X^{31}$, $X^{32}$, $X^{33}$, $X^{34}$, $X^{35}$, $X^{36}$, $X^{37}$, $X^{38}$, $X^{39}$, $X^{40}$, $X^{41}$, and $X^{42}$ are the same or different from each other, and are S, O or $SO_2$, $X^{11}$, $X^{23}$, $X^{38}$ is sulfone ($-SO_2-$), $X^7$, $X^{18}$, $X^{19}$, $X^{30}$, $X^{31}$, and $X^{42}$ are ether linkage ($-O-$), $T^1$, $T^2$, $T^3$, $T^4$, $T^5$, $T^6$, $T^7$, $T^8$, $T^9$, $T^{10}$, $T^{11}$, $T^{12}$, $T^{13}$, $T^{14}$, $T^{15}$, $T^{16}$, $T^{17}$, $T^{18}$, $T^{19}$, $T^{20}$, $T^{21}$, $T^{22}$, $T^{23}$, $T^{24}$, $T^{25}$, $T^{26}$, $T^{27}$, $T^{28}$, $T^{29}$, $T^{30}$, $T^{31}$, $T^{32}$, $T^{33}$, $T^{34}$, $T^{35}$, $T^{36}$, $T^{37}$, $T^{38}$, $T^{39}$, $T^{40}$, $T^{41}$, $T^{42}$, $T^{43}$, $T^{44}$, $T^{45}$, $T^{46}$, $T^{47}$, $T^{48}$, $T^{49}$, $T^{50}$, $T^{51}$, $T^{52}$, $T^{53}$, $T^{54}$, $T^{55}$, $T^{56}$, $T^{57}$, are the same or different from each other F, CN or $SO_3H$, $T^9$, $T^{10}$, $T^{28}$, $T^{29}$, $T^{48}$, and $T^{49}$, are sulfuric acid groups ($-SO_3H$), $T^9$, $T^{10}$, $T^{28}$ are nitrile groups ($-CN$), k1, k3, and k5 are the same or different from each other (hydrophilic part) and an integer of 0.4 to 0.6. k2, k4, and k6 are 1-k1, 1-k3, and 1-k5 (hydrophobic part), which are the same or different from each other, and an integer of 0.6 to 0.4. For example, if k1, k3, k5 are 0.6, k2, k4, k6 of 0.4).

The polymer resin represented by the following Chemical Formula 3 has hydrophilic and hydrophobic separated morphology, so that it provides high ion conductive under low relative humidity to the polymer ion exchange membrane.

In another embodiment, may include a hydrocarbon-based polymer represented by following Chemical Formula 4.

In the above Chemical Formula 4,
$X_1$, $X_2$, $X_3$, $X_4$, $X_5$, $X_6$, $X_7$ and $X_8$ are the same or different from each other and are $SO_2$, or O, $Y_1$ and $Y_2$ are $SO_3H$ or $SO_3Na$, $Y_3$, $Y_4$, $Y_5$, $Y_6$, $Y_7$, $Y_8$, $Y_9$, and $Y_{10}$ are F, A is an integer of 5 to 30, which means the chain length of hydrophilic oligomer from 5 kg/mol to 15 kg/mol, B is an integer of 10 to 40, which means the chain length of hydrophobic oligomer from 5 kg/mol to 15 kg/mol and m is an integer of 2 to 20 when molecular weight of multiblock copolymer is in range from 50 kg/mol to 200 kg/mol. In the above Chemical Formula 4, when p1 is included within the range, an ion conductive polymer includes a sufficient hydrophilic ion channel area and secures high ion conductive and electrochemical properties.

In a fuel cell, a polymer electrolyte membrane contacts an electrode with a catalyst on an electrode substrate through a binder in the catalyst as shown in FIG. 1. Herein, the polymer electrolyte membrane made of a hydrocarbon-based polymer has bad compatibility with a binder in the catalyst layer, and particularly a fluorine-based binder, and thus may be more easily delaminated from the catalyst layer on the electrode than a polymer electrolyte membrane made of a fluorine-based polymer. This layer-separation problem may be solved by adjusting the surface of a polymer electrolyte membrane to be hydrophobic, similar to a fluorine-based binder in the catalyst layer, thus improving compatibility of the polymer electrolyte membrane with the catalyst layer of an electrode and resultantly the junction of the polymer electrolyte membrane with the catalyst layer.

[Chemical Formula 4]

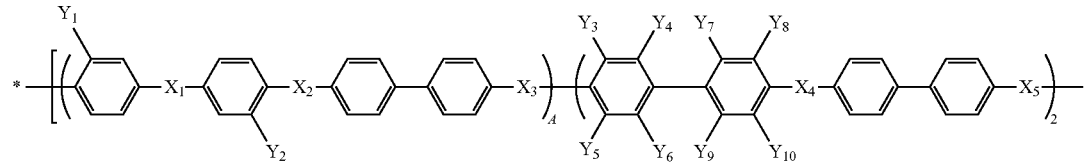

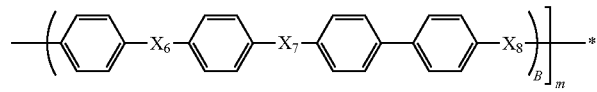

When the polymer electrolyte membrane is made of a hydrocarbon-based polymer, it may have a better junction with the catalyst layer.

In addition, the proton conductive polymer may include a proton conductive group including Na, K, Li, Cs, or tetrabutyl ammonium substituted for H. When H in the proton conductive group of a proton conductive polymer is substituted with Na, NaOH or NaCl is used, when H is substituted with tetrabutylammonium, tetrabutylammonium hydroxide is used, and the proton conductive group may be substituted with K, Li, or Cs using an appropriate compound. This substitution is well-known in this related field and will not be illustrated in detail. In addition, when Na, K, Li, Cs, or tetrabutyl ammonium is substituted for H, a polymer electrolyte membrane may be acid-treated and transformed into an $H^+$ form.

Furthermore, a polymer electrolyte membrane according to one embodiment of the present invention may be effectively applied to a low humidifying polymer electrolyte fuel cell. The reason is that an effect of adjusting the electrolyte membrane to have moisturizing ability or a hydrophobic surface may be inadequate or deteriorated in a direct oxidation fuel cell in which the membrane is always maintained in a hydration state by using a liquid fuel such as methanol.

As for a low humidifying polymer electrolyte fuel cell, a polymer electrolyte membrane may be continuously changed in a hydration state due to water produced from a reaction of the fuel cell, and may also have different humidifying degrees of a gas fuel such as hydrogen gas supplied to an anode and an oxidizing agent such as oxygen gas supplied to a cathode, and particularly unstable humidifying degrees when practically applied to the fuel cell. Accordingly, ion conductivity is unstably changed due to water retained in a polymer electrolyte membrane and thus stable power density is not maintained, and a polymer electrolyte membrane may be repeatedly swollen and contracted and thus delaminated.

This problem was thought to be suppressed when a polymer electrolyte membrane was treated to be hydrophilic. However, the problem can be effectively suppressed according to one embodiment of the present invention when a polymer electrolyte membrane is treated to be hydrophobic. In other words, since a polymer electrolyte membrane according to one embodiment of the present invention has an appropriate surface contact angle to be hydrophobic on the surface and simultaneously ensures ion conductivity due to particular nanosized crack morphology, the problem may be suppressed.

Furthermore, unlike a direct oxidation fuel cell that is well-equipped with a water channel for proton transfer since an electrolyte membrane is completely humidified by water included in a liquid fuel, in a high temperature low humidifying polymer electrolyte fuel cell including relatively less water and being operated at 100° C. or more, a proton channel is unfavorably formed and thus it may inefficiently transfer protons. However, an electrolyte membrane according to one embodiment of the present invention may constantly maintain an internal hydration state.

According to another embodiment of the present invention, a method of preparing the polymer electrolyte membrane is provided. The preparing method may include hydrophobic-treatment of a hydrocarbon-based proton conductive polymer membrane by using plasma. The plasma treatment modifies the surface of the polymer electrolyte membrane by exposing the surface to partially-ionized gas in a plasma state. However, since the modification occurs on a very small surface, the polymer electrolyte membrane itself may not only be treated without damage or a large property change, but may also have few pollutants. Hereinafter, the plasma treatment will be illustrated in more detail.

First of all, a hydrocarbon-based proton conductive polymer membrane is placed on a sample stage in a plasma chamber. Herein, one side of the hydrocarbon-based proton conductive polymer membrane is placed toward a plasma generator with the other side toward the bottom of the sample stage in order to plasma-treat one side thereof. The one side indicates one surface of a proton conductive polymer membrane in a length direction, in other words, the surface contacting a cathode or an anode when a membrane-electrode assembly is fabricated. The proton conductive polymer membrane is made of the aforementioned proton conductive polymer.

In this way, one surface of a proton conductive polymer membrane is plasma-treated, but the other side may be plasma-treated after plasma-treating the one side in the same method.

Next, the plasma treatment is performed by blowing in a first gas selected from argon gas, nitrogen gas, oxygen gas, helium gas, or a combination thereof, and a second gas selected from hydrocarbon gas, fluorocarbon gas, or a combination thereof. According to one embodiment of the present invention, the plasma treatment may be performed by blowing in the second gas of fluorocarbon gas along with the first gas.

The hydrocarbon gas may be selected from $CH_4$ gas, $C_2H_2$ gas, or a combination thereof. The fluorocarbon gas may be selected from $CF_4$ gas, $C_4F_8$ gas, or a combination thereof. When a mixed gas is used, the mixing ratio may be appropriately adjusted. In addition, the $C_2H_2$ gas may include a commercially-available gas such as $C_2H_2$/Ar gas, $C_2H_2$/He gas, or $C_2H_2$/N2 gas. Herein, the mixing ratio of $C_2H_2$ gas with Ar, He, or N2 gas may have no actual influence on the present invention and thus may be appropriately adjusted.

The plasma treatment may be performed by blowing in the first gas at a rate of 15 l/min to 30 l/min, and in another embodiment, 20 l/min to 25 l/min. When the first gas is blown in within the range, plasma may be well-formed and thus smoothly promote radical reaction of the second gas.

In the plasma treatment, the second gas may be blown in at a rate of 5 ml/min to 50 ml/min. Herein, when the second gas is blown in by changing a rate of 5 ml/min to 20 ml/min, and in particular, 10 ml/min to 15 ml/min, the polymer electrolyte membrane may have weak hydrophobicity. When the second gas is blown in by changing the rate of 20 ml/min to 50 ml/min, the polymer electrolyte membrane may be superhydrophobic. When the second gas is blown in within the range, it may not disturb plasma formation of the first gas and may appropriately have a radical reaction without wasting gas on the polymer surface.

The plasma treatment may be performed by changing an output condition of 100 to 200 W. When output of a plasma generator is high power of over 200 W, a high energy level of plasma may decompose a polymer electrolyte and etch a particular area and thus form a pin hole on the polymer electrolyte membrane.

On the contrary, when the output of a plasma generator is lower than 100 W, the energy level is too low to sufficiently transfer reaction gas in a plasma state, and thus causes a problem of not smoothing fluorocarbon adsorption and a plasma polymer polymerization reaction. According to one embodiment of the present invention, a method of preparing the polymer electrolyte membrane may include 10 to 40 hydrophobic treatments using plasma. When the hydrophobic treatment is performed 10 to 40 times, the polymer electrolyte membrane may be appropriately hydrophobic on the surface, and a coating layer thereon may be formed to have a desired thickness. When the hydrophobic treatment using plasma is performed less than 10 times, a hydrophobic coating layer may not be sufficiently deposited and not perfectly formed, while when the hydrophobic treatment using plasma is performed at greater than 40 times, plasma polymer polymerization may be too much activated and form too thick a coating layer and deteriorate ion conductivity of the polymer electrolyte membrane. According to one embodiment of the present invention, the polymer electrolyte membrane may have a surface contact angle that is adjusted depending on kinds of gas atmosphere for the plasma treatment, a flow rate of the gas, and number of the treatment.

For example, when the plasma treatment is performed by blowing in a first gas selected from argon gas, nitrogen gas, oxygen gas, helium gas, or a combination thereof and a second gas selected from $CF_4$ gas, $C_4F_8$ gas, and a combination thereof, a polymer electrolyte membrane may have a surface contact angle of more than or equal to 70° and less than 120° and thus may be hydrophobic.

In addition, when the plasma treatment is performed by blowing in a first gas selected from argon gas, nitrogen gas, oxygen gas, helium gas, or a combination thereof and a second gas selected from $C_2H_2$ gas, $CF_4$ gas, $C_4F_8$ gas, or a combination thereof, a polymer electrolyte membrane may have a surface contact angle ranging from 120° to 180° and thus may be superhydrophobic.

Accordingly, the plasma treatment in the present invention may be performed by blowing in a first gas selected from argon gas, nitrogen gas, oxygen gas, helium gas, or a combination thereof and a second gas selected from $CF_4$ gas, $C_4F_8$ gas, and a combination thereof.

In this way, a polymer electrolyte membrane may have surface properties that are easily adjusted for a desired purpose.

Accordingly, a polymer electrolyte membrane may have a hydrophobic property with a contact angle ranging from 70° to 180°. The polymer electrolyte membrane may maintain an internal proton conductive polymer membrane property. When a polymer electrolyte membrane has a hydrophobic internal property within the range, that is to say, when a polymer electrolyte membrane is prepared to include a hydrophobic material, the polymer electrolyte membrane may have too low a water content ratio, deteriorating proton conductivity, but a polymer electrolyte membrane according to one embodiment of the present invention may not have this problem.

According to another embodiment of the present invention, a polymer electrolyte fuel cell system is provided.

The fuel cell system includes an electricity generating element, a fuel supplier, and an oxidizing agent supplier. The electricity generating element generates electricity through oxidation of a fuel and reduction of an oxidizing agent. The fuel supplier plays a role of supplying the electricity generating element with a fuel, and the oxidizing agent supplies the electricity generating element with an oxidizing agent. The oxidizing agent may include oxygen or air. In addition, the fuel may include a gas or a liquid hydrogen fuel.

The electricity generating element includes at least one membrane-electrode assembly including an anode and a cathode facing each other and a polymer electrolyte membrane interposed between the anode and cathode, and a separator. The polymer electrolyte membrane may have a junction with a binder included in the anode and the cathode. The polymer electrolyte membrane is a polymer electrolyte membrane according to one embodiment of the present invention, and will be illustrated in more detail.

The polymer electrolyte membrane may have a first surface contacting the anode and a second surface contacting the cathode, and at least either of the first and second surfaces may have a contact angle ranging from 70° to 180°.

In addition, at least either of the first and second surfaces may have a contact angle of greater than or equal to 70° and less than or equal to 120°, or greater than or equal to 70° and less than or equal to 115° In addition, the contact angle may be 80° to 180°. In addition, at least either of the first and second surfaces may have a contact angle of greater than or equal to 80° and less than or equal to 120°, or greater than or equal to 80° and less than or equal to 115°.

In one embodiment of the present invention, the second surface may have a contact angle in a range of 70° to 180°, greater than or equal to 70° and less than or equal to 120°, or 70° to 115°. In one embodiment of the present invention, the second surface may have a contact angle in a range of 80° to 180°, greater than or equal to 80° and less than or equal to 120°, or greater than or equal to 80° and less than or equal to 115°. When the second surface has a contact angle within the range, a cathode has a higher water concentration than an anode, more effectively suppressing swelling of an electrolyte membrane, deterioration of proton concentration, and water flooding in the electrode membrane.

In addition, both of the first and second surfaces have a contact angle ranging from 70° to 180°, and in another embodiment, greater than or equal to 70° and less than or equal to 120°, or 70° to 115°. In addition, both of the first and second surfaces have a contact angle ranging from 80° to 180°, greater than or equal to 80° and less than or equal to 120°, or 80° to 115°. When the first and second surfaces both have a contact angle within the range, a polymer electrolyte membrane may be effectively suppressed from swelling, proton concentration deterioration, and water flooding, and may have a better contact property with an electrode, remarkably decreasing the entire interface resistance and effectively suppressing moisture loss from inside of the electrolyte membrane. As a result, a polymer electrolyte-type fuel cell with excellent chemical cell performance is provided.

The cathode and anode include an electrode substrate and a catalyst layer, respectively.

The catalyst layer can include any catalyst participating in a fuel cell reaction, for example, a platinum-based catalyst. The platinum-based catalyst may be at least one selected from the group consisting of platinum, ruthenium, osmium, a platinum-ruthenium alloy, a platinum-osmium alloy, a platinum-palladium alloy, and a platinum-M alloy (M is at least one transition element selected from the group consisting of Ga, Ti, V, Cr, Mn, Fe, Co, Ni, Cu, Zn, Sn, Mo, W, Rh, and Ru).

Such a metal catalyst may be used in a form of a metal itself (black catalyst), or may be used by being supported on a carrier. The carrier may include carbon such as graphite, denka black, ketjen black, acetylene black, carbon nanotubes, carbon nanofiber, carbon nanowire, carbon nanoballs, activated carbon, and the like, or an inorganic particulate such as alumina, silica, zirconia, titania, and the like. The carbon is generally used in the art. A noble metal supported on a carrier may be a commercially available one or may be prepared by supporting a noble metal on a carrier. The method of supporting a noble metal on a carrier is well-known in this related field, and a detailed description thereof is omitted, which will be understood by a person having a skill in this art.

The catalyst layer may further include a binder to improve adherence between a polymer electrolyte membrane and an electrode and to transfer protons.

The binder may be a proton conductive polymer resin having a cation exchange group selected from the group consisting of a sulfonic acid group, a carboxylic acid group, a phosphoric acid group, a phosphonic acid group, and derivatives thereof at its side chain. Examples of the binder include at least one proton conductive polymer selected from the group consisting of a fluorine-based polymer, a benzimidazole-based polymer, a benzoxide-based polymer, a polyimide-based polymer, a polyetherimide-based polymer, a polyphenylene sulfide-based polymer, a polysulfone-based polymer, a polyethersulfone-based polymer, a polyetherketone-based polymer, a polyether-etherketone-based polymer, and a polyphenylquinoxaline-based polymer.

The proton conductive polymer includes at least one selected from the group consisting of poly(perfluorosulfonic acid) (commercially available Nafion), poly(perfluorocarboxylic acid), a sulfonic acid group-containing copolymer of tetrafluoroethylene and fluorovinylether, sulfonated polyarylene ether sulfone, sulfonated polyether ether ketone, sulfonated polyphosphazene, sulfonated polyarylene sulfide, sulfonated polyarylene sulfide, polybenzoxazole, poly(2,2'-m-phenylene)-5,5'-bibenzimidazole, and poly(2,5-benzimidazole).

The hydrogen (H) in the cation exchange group of the proton conductive polymer can be substituted with Na, K, Li, Cs, or tetrabutylammonium. When the H in the cation exchange group at the terminal end of the proton conductive polymer side chain is substituted with Na or tetrabutylammonium, NaOH or tetrabutylammonium hydroxide may be used during preparation of the catalyst composition, respectively. When the H is substituted with K, Li, or Cs, suitable compounds for the substitutions may be used. Since such a substitution is known to this art, a detailed description thereof is omitted.

The binder may be used singularly or in a combination. The binder may be used along with non-conductive polymers to improve adherence with a polymer electrolyte membrane. The binder may be used in a controlled amount depending on the purpose.

Examples of the non-conductive compound include one selected from the group consisting of polytetrafluoroethylene (PTFE), a tetrafluoroethylene-hexafluoropropylene copolymer (FEP), a tetrafluoroethylene-perfluoro alkylvinylether copolymer (PFA), ethylene/tetrafluoroethylene (ETFE), an ethylenechlorotrifluoro-ethylene copolymer (ECTFE), polyvinylidene fluoride, a polyvinylidene fluoride-hexafluoropropylene copolymer (PVdF-HFP), dodecylbenzene sulfonic acid, and sorbitol.

In a fuel cell, an electrode substrate plays a role of supporting an electrode and diffusing a fuel and an oxidant into a catalyst layer, so that the fuel and the oxidant can easily approach the catalyst layer. The electrode substrates are formed of a material such as carbon paper, carbon cloth, carbon felt, or a metal cloth (a porous film composed of metal fiber or a metal film disposed on the surface of a cloth composed of polymer fibers). The electrode substrate is not limited thereto.

The electrode substrate may be treated with a fluorine-based resin to be water-repellent to prevent deterioration of diffusion efficiency due to water generated during operation of a fuel cell. The fluorine-based resin may include polytetrafluoroethylene, polyvinylidene fluoride, polyhexafluoropropylene, polyperfluoroalkyl vinylether, polyperfluoro sulfonylfluoride alkoxyvinyl ether, fluorinated ethylene propylene, polychlorotrifluoroethylene, or a copolymer thereof.

In addition, a microporous layer can be further positioned to increase reactant diffusion effects in the electrode substrate. The microporous layer generally includes conductive powders with a certain particle diameter. The conductive material may include, but is not limited to, carbon powder, carbon black, acetylene black, ketjen black, activated carbon, carbon fiber, fullerene, nano-carbon, or combinations thereof. The nano-carbon may include a material such as carbon nanotubes, carbon nanofiber, carbon nanowire, carbon nanohorns, carbon nanorings, or combinations thereof.

The microporous layer is formed by coating a composition including a conductive powder, a binder resin, and a solvent on the conductive substrate. The binder resin may include polytetrafluoroethylene, polyvinylidene fluoride, polyhexafluoropropylene, polyperfluoroalkylvinylether, polyperfluorosulfonyl fluoride, alkoxyvinyl ether, polyvinyl alcohol, cellulose acetate, or copolymers thereof. The solvent may include an alcohol such as ethanol, isopropyl alcohol, n-propyl alcohol, butanol, and so on, water, dimethyl acetamide, dimethyl sulfoxide, N-methylpyrrolidone, or tetrahydrofuran. The coating method may include, but is not limited to, screen printing, spray coating, doctor blade methods, gravure coating, dip coating, silk screening, painting, and so on, depending on the viscosity of the composition.

Figure 2:
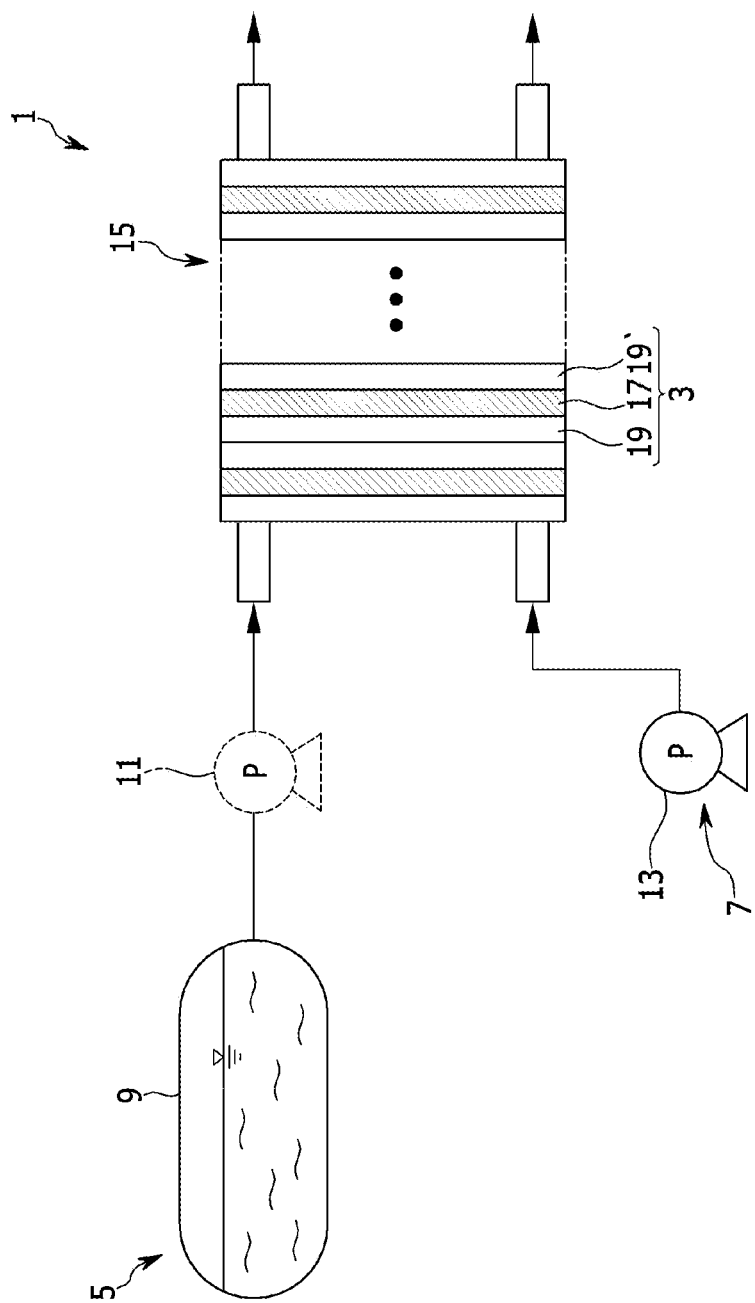
FIG. 2 provides a drawing schematically illustrating the structure of a fuel cell system according to one embodiment of the present invention.

FIG. 2 shows the schematic structure of a fuel cell system that will be described in detail with reference to this accompanying drawing as follows. FIG. 2 illustrates a fuel cell system in which a fuel and an oxidant are provided to the electricity generating element through pumps, but the present invention is not limited to such structures. The fuel cell system of the present invention alternatively includes a structure wherein a fuel and an oxidant are provided in a diffusion manner.

A fuel cell system 1 includes at least one electricity generating element 3 that generates electrical energy through the electrochemical reaction of a fuel and an oxidant, a fuel supplier 5 for supplying a fuel to the electricity generating element 3, and an oxidant supplier 7 for supplying an oxidant to the electricity generating element 3.

In addition, the fuel supplier 5 is equipped with a tank 9 that stores a fuel, and a fuel pump 11 that is connected therewith. The fuel pump 11 supplies the fuel stored in the tank 9 with a predetermined pumping power.

The oxidant supplier 7, which supplies the electricity generating element 3 with an oxidant, is equipped with at least one pump 13 for supplying the oxidant with a predetermined pumping power.

The electricity generating element 3 includes a membrane-electrode assembly 17 that oxidizes hydrogen or a fuel and reduces an oxidant, and separators 19 and 19' that are respectively positioned at opposite sides of the membrane-electrode assembly and supply hydrogen or a fuel and an oxidant. At least one electricity generating element 3 is composed in a stack 15.

The following examples illustrate the present invention in more detail. However, it is understood that the present invention is not limited by these examples.

Example 1

A 50 μm-thick proton conductive polymer membrane formed of a polymer resin including a first repeating unit represented by the following Chemical Formula 1a and a second repeating unit represented by the following Chemical Formula 2a was put on a sample stage with one side toward a plasma generator and the opposite side toward the bottom of the sample stage in a plasma chamber.

[Chemical Formula 1a]

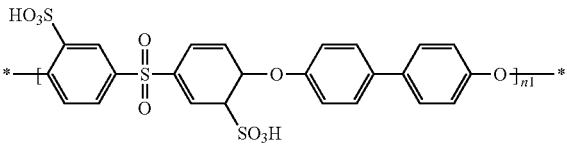

[Chemical Formula 2a]

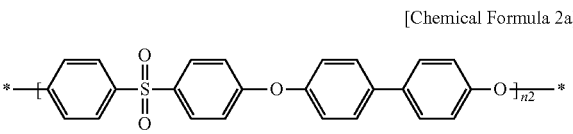

In the above Chemical Formulae 1a and 2a, n2 is 100-n1, and n1 is 40.

Subsequently, the proton conductive polymer membrane was plasma-treated by blowing in helium gas at a rate of 25 l/min and $C_4F_8$ gas at a rate of 10 ml/min under an output condition of 13.56 MHz RF and 150 W to form an electrolyte layer with a hydrophobic surface on one side.

Then, the other surface of the electrolyte layer with a hydrophobic surface was plasma-treated under the same conditions, acquiring a polymer electrolyte membrane for a fuel cell having a hydrophobic surface on both sides. The hydrophobic treatment was performed 10 times.

In the polymer electrolyte membrane, the hydrophobic surface treatment was performed to be less than 5 nm deep from the outermost surface. The manufactured polymer electrolyte membrane includes a sulfonic acid functional group and a fluorocarbon functional group on the surface, and includes a hydrophobic passivation thin coating layer having a thickness of 1 nm to 5 nm.

Example 2

A polymer electrolyte membrane was manufactured according to the same method as in Example 1, except the hydrophobic treatment was repeated 20 times. The manufactured polymer electrolyte membrane includes a sulfonic acid functional group and a fluorocarbon functional group on the surface, and includes a hydrophobic passivation coating layer having a thickness of 5 nm to 20 nm.

Example 3

A polymer electrolyte membrane was manufactured according to the same method as in Example 1, except the hydrophobic treatment was repeated 30 times. The manufactured polymer electrolyte membrane includes a fluorocarbon functional group on the surface, and includes a hydrophobic passivation coating layer having a thickness of 20 nm to 40 nm.

Example 4

A polymer electrolyte membrane was manufactured according to the same method as in Example 1, except a polymer resin including a first repeating unit represented by the following Chemical Formula 1a and a second repeating unit represented by the following Chemical Formula 2a was used. The manufactured polymer electrolyte membrane includes a fluorocarbon functional group on the surface, and includes a hydrophobic passivation coating layer having a thickness of 30 nm to 50 nm.

[Chemical Formula 1a]

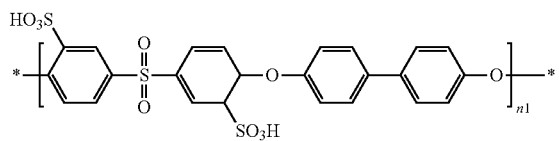

[Chemical Formula 2a]

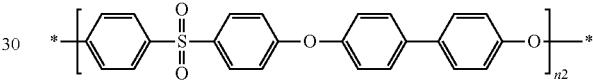

In the above Chemical Formulae 1a and 2a, n2 is 100-n1, and n1 is 60.

Example 5

A polymer electrolyte membrane was manufactured according to the same method as in Example 4, except the hydrophobic treatment was performed 40 times. The manufactured polymer electrolyte membrane includes a fluorocarbon functional group on the surface, and includes a hydrophobic passivation coating layer having a thickness of 140 nm to 260 nm.

Example 6

A 50 μm-thick proton conductive polymer membrane formed of a polymer resin represented by the following Chemical Formula 3k and [Chemical Formula 3f] was put on a sample stage with one side toward a plasma generator and the opposite side toward the bottom of the sample stage in a plasma chamber.

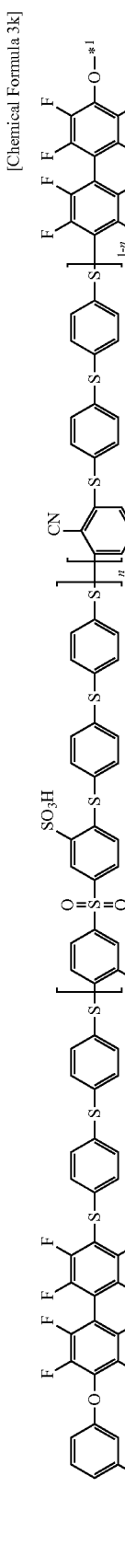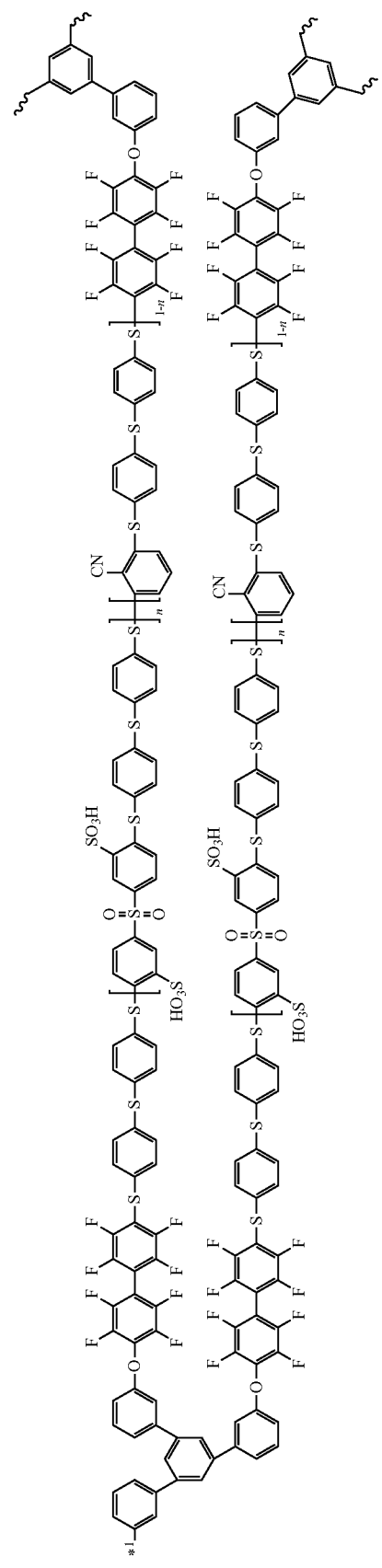

In the above Chemical Formulas 3k and 3f, n is 0.6. and 1-n is hydrophobic part and is 0.4. Furthermore, *1 indicates a bond between Chemical Formula 3k and Chemical Formula 3f.

Subsequently, the proton conductive polymer membrane was plasma-treated by blowing in helium gas at a rate of 25 l/min and $C_4F_8$ gas at a rate of 10 ml/min under an output condition of 13.56 MHz RF and 150 W to form an electrolyte layer with a hydrophobic surface on one side.

Then, the other surface of the electrolyte layer with a hydrophobic surface was plasma-treated under the same conditions, acquiring a polymer electrolyte membrane for a fuel cell having a hydrophobic surface on both sides. The hydrophobic treatment was performed 30 times

Example 7

A 60 µm-thick proton conductive polymer membrane formed of a polymer resin (BPSH100-BPS0 multiblock copolymer) represented by the following Chemical Formula 4a was put on a sample stage with one side toward a plasma generator and the opposite side toward the bottom of the sample stage in a plasma chamber.

Comparative Example 2

The same 50 µm-thick proton conductive polymer membrane made of a polymer resin of Example 4 was used as a polymer electrolyte membrane for a fuel cell.

Comparative Example 3

The same 50 µm-thick proton conductive polymer membrane made of a polymer resin of Example 6 was used as a polymer electrolyte membrane for a fuel cell.

Comparative Example 4

The same 60 µm-thick proton conductive polymer membrane made of a polymer resin of Example 7 was used as a polymer electrolyte membrane for a fuel cell.

EDX and XPS Measurement

Figure 3:
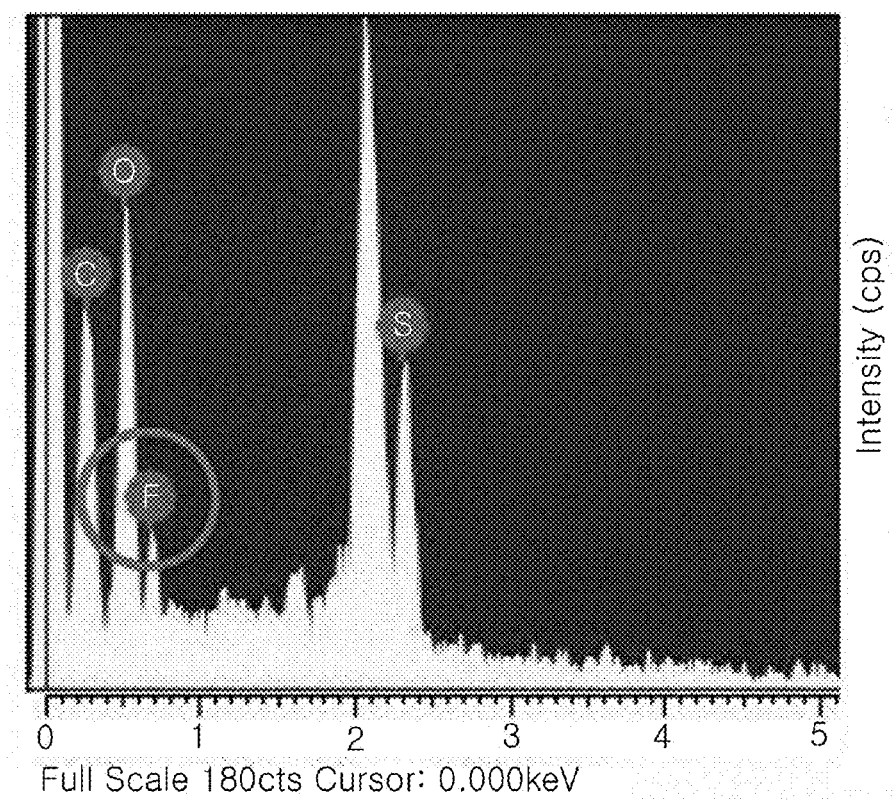
FIG. 3 is a graph showing EDX measurement results on the surface of a polymer electrolyte membrane according to Example 2.
Figure 4:
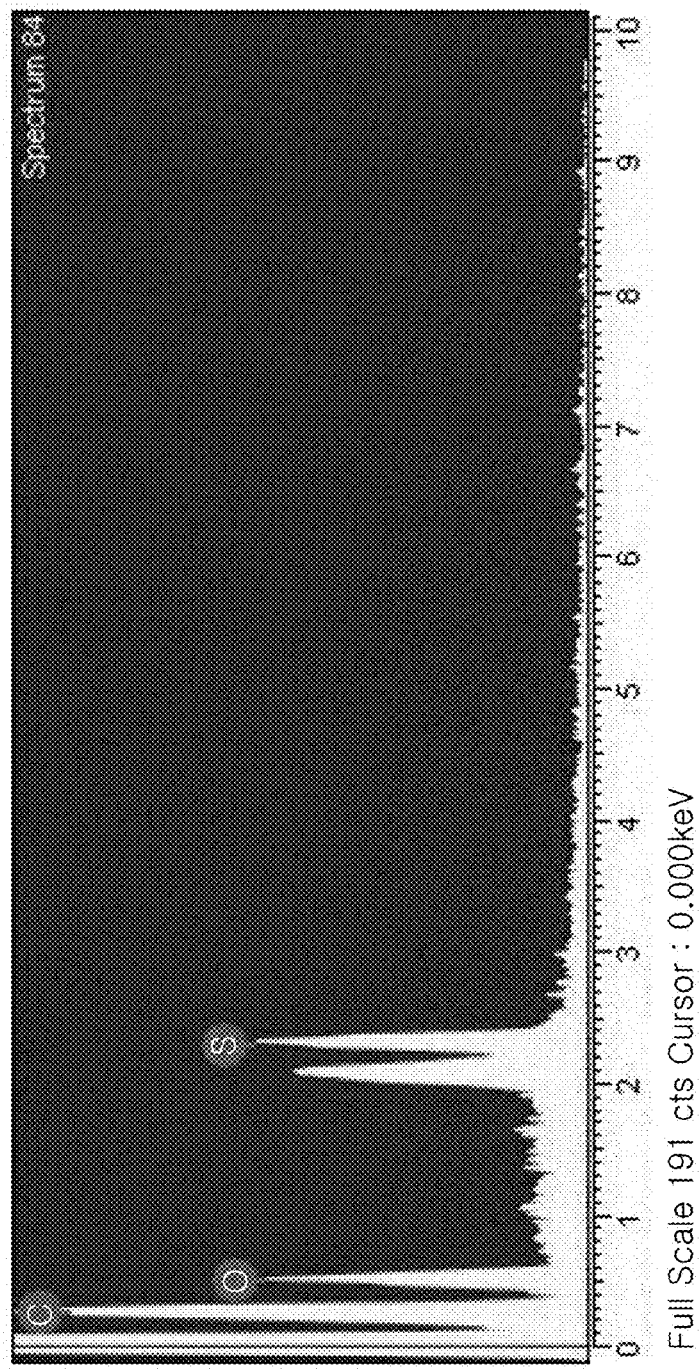
FIG. 4 is a graph showing EDX measurement results on the surface of a polymer electrolyte membrane according to Comparative Example 1.

EDX on the surfaces of the polymer electrolyte membranes according to Example 2 and Comparative Example 1 was measured, and the results are respectively provided in FIGS. 3 and 4. As shown in FIGS. 3 and 4, an element F was present on the surface of the polymer electrolyte membrane

[Chemical Formula 4a]

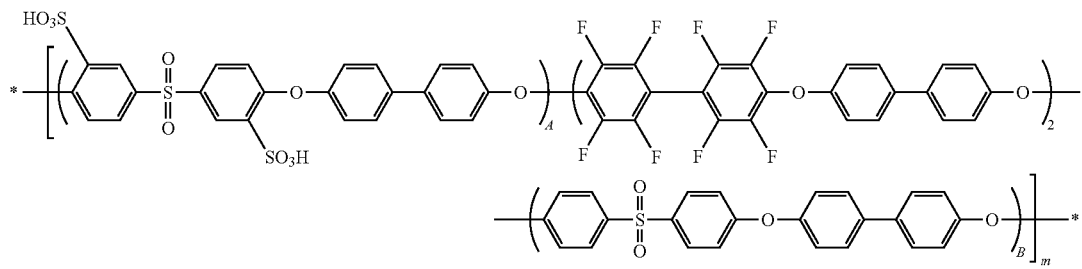

In the above Chemical Formula 4a, A is an integer of 18, which means the chain length of hydrophilic oligomer 10 kg/mol, B is an integer of 12, which means the chain length of hydrophobic oligomer is 5 kg/mol and m is an integer of 3 to 13, when molecular weight of multiblock copolymer is in range from 50 kg/mol to 200 kg/mol.

The polymer resin was prepared by a coupling reaction between phenoxide terminated disulfonated PAES (BPSH100) with block lengths of 10 kg/mol and decafluorobiphenyl end-capped unsulfonated PAES (BPS0) oligomers with the block lengths of 5 kg/mol.

Subsequently, the proton conductive polymer membrane was plasma-treated by blowing in helium gas at a rate of 25 l/min and $C_4F_8$ gas at a rate of 10 ml/min under an output condition of 13.56 MHz RF and 150 W to form an electrolyte layer with a hydrophobic surface on one side.

Then, the other surface of the electrolyte layer with a hydrophobic surface was plasma-treated under the same conditions, acquiring a polymer electrolyte membrane for a fuel cell having a hydrophobic surface on both sides. The hydrophobic treatment was performed 30 times

Comparative Example 1

The same 50 µm-thick proton conductive polymer membrane made of a polymer resin of Example 1 was used as a polymer electrolyte membrane for a fuel cell.

according to Example 2, while the element F was not present on the surface of the polymer electrolyte membrane according to Comparative Example 1.

Figure 5:
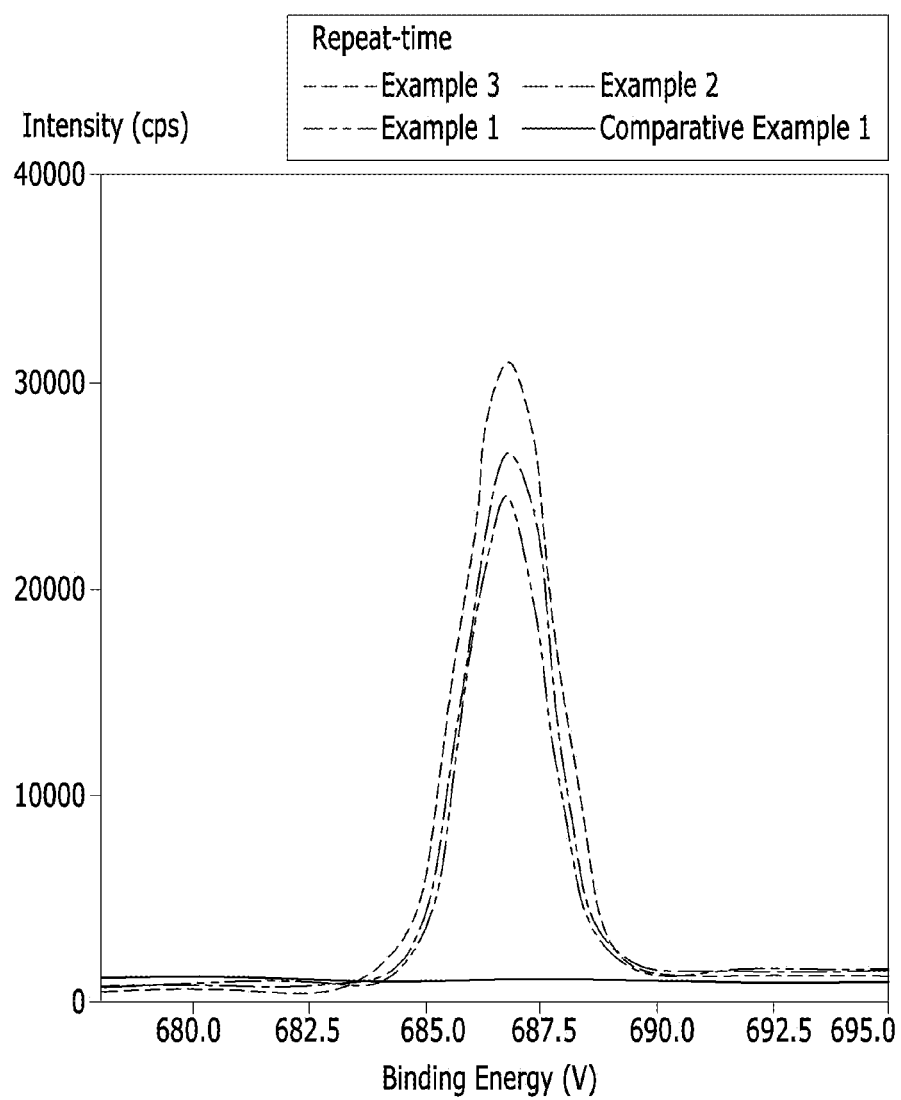
FIG. 5 is a graph showing XPS measurement results of polymer electrolyte membranes according to Examples 1 to 3 and Comparative Example 1.

In addition, XPS measurement results of the polymer electrolyte membranes according to Examples 1 to 3 and Comparative Example 1 are provided in FIG. 5. As shown in FIG. 5, the polymer electrolyte membranes obtained by performing a hydrophobic treatment according to Examples 1 to 3 10 times, 20 times, and 30 times showed a peak of bonding energy ranging from about 682.5 eV to about 690 eV corresponding to the element F, while the polymer electrolyte membrane manufactured by performing no hydrophobic treatment according to Comparative Example 1 showed no peak. In addition, as the number of the hydrophobic treatments was increased, intensity of the peak increased, which shows that the amount of the F element was increased.

Surface Contact Angle Measurement

Figure 6:
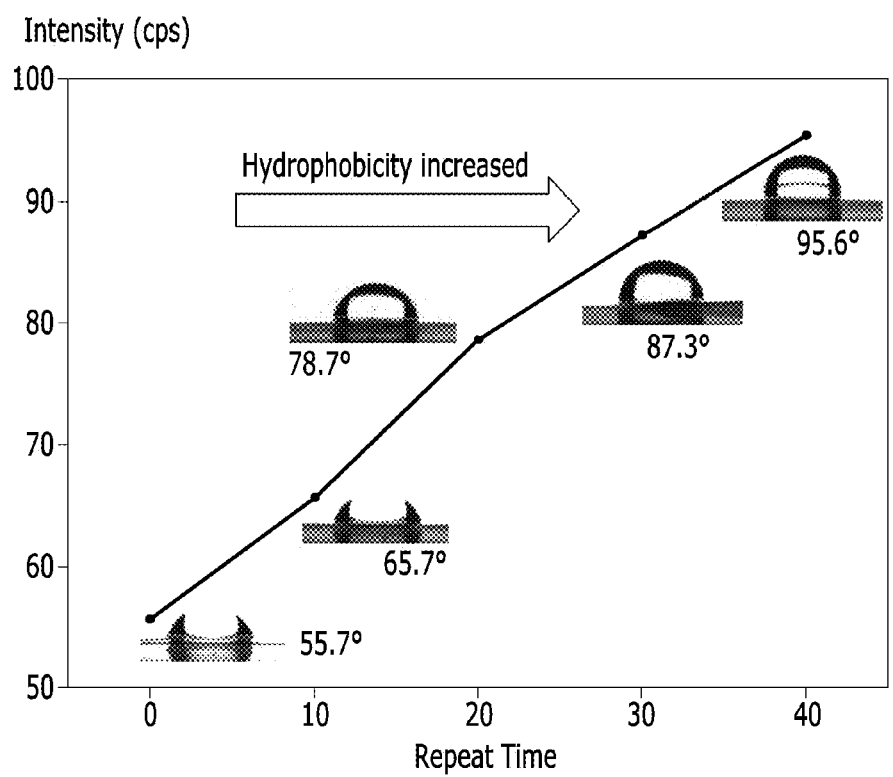
FIG. 6 is a graph showing surface contact angle measurement results of polymer electrolyte membranes according to Examples 2, 3, and 5 and Comparative Example 1 depending on the number of plasma treatments.

Surface contact angles of the polymer electrolyte membranes according to Examples 1 to 3 and 5 and Comparative Example 1 were measured, and the results are provided in FIG. 6.

Herein, the surface angle was measured using commercially-available equipment (DIGIDROP, GBX). In particular, a small water drop was dropped on the surface of a polymer electrolyte membrane with a thin needle, and then observed regarding the shape to measure the angle of the inside of the water drop against the surface of the membrane.

As shown in FIG. 6, the polymer electrolyte membrane manufactured by performing the hydrophobic treatment according to Example 1 10 times showed a contact angle of 65.7°, the polymer electrolyte membrane manufactured by performing the hydrophobic treatment according to Example 2 20 times showed a contact angle of 78.7°, the polymer electrolyte membrane manufactured by performing the hydrophobic treatment according to Example 3 30 times showed a contact angle of 87.3°, the polymer electrolyte membrane manufactured by performing the hydrophobic treatment according to Example 5 40 times showed a contact angle of 95.6°, while the polymer electrolyte membrane manufactured by performing no hydrophobic treatment according to Comparative Example 1 showed a contact angle of 55.7°, and accordingly, as a polymer electrolyte membrane was more hydrophobically treated, its surface contact angle was increased, and the polymer electrolyte membrane became more hydrophobic.

Figure 7:
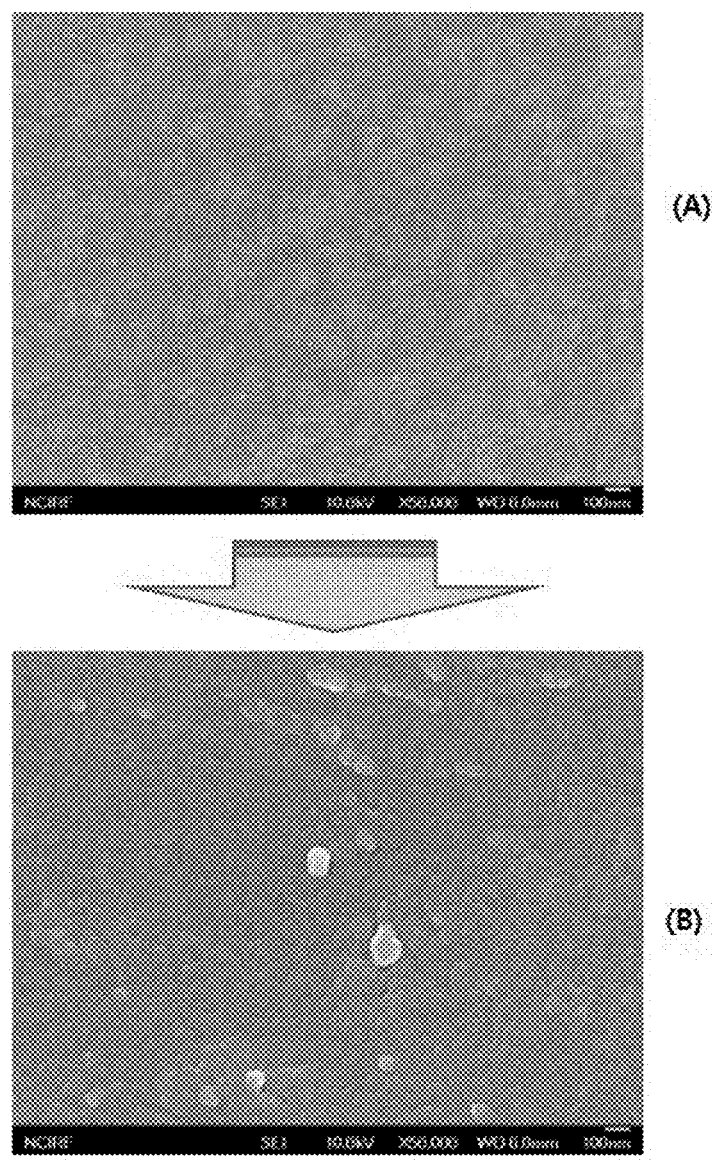
FIG. 7 shows SEM images of the surfaces of polymer electrolyte membranes according to Comparative Example 1(A) and Example 3(B).

In addition, SEM images of the surfaces of the polymer electrolyte membranes according to Comparative Example 1 and Example 3 when the surface contact angle was measured are respectively provided in (A) of FIG. 7 and (B) of FIG. 7. As shown in (B) of FIG. 7, the polymer electrolyte membrane having a high surface contact angle according to Example 3 showed that a water drop was formed, while the polymer electrolyte membrane having a low surface contact angle according to Comparative Example 1 ((A) of FIG. 7) showed that a water drop was almost not formed.

Internal Properties of Polymer Electrolyte Membrane

Figure 8:
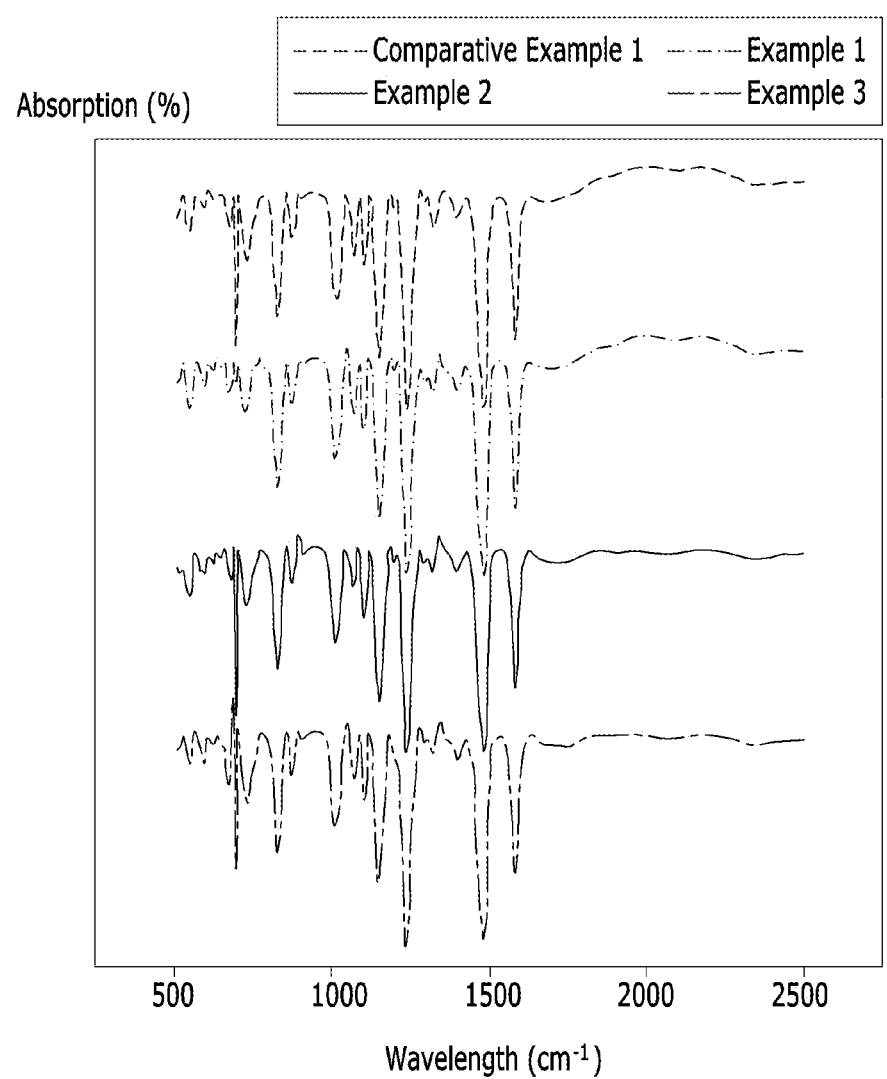
FIG. 8 is a graph showing FT-IR measurement results of the polymer electrolyte membranes according to Examples 1 to 3 and Comparative Example 1.

Internal properties of the polymer electrolyte membranes according to Examples 1 to 3 and Comparative Example 1 were evaluated by measuring FT-IR of the polymer electrolyte membranes, and the results are provided in FIG. 8. As shown in FIG. 8, since the FT-IR results of Examples 1 to 3 and Comparative Example 1 showed almost no absorption band change, the internal properties of the polymer electrolyte membranes were not changed due to the hydrophobic treatment. The result showed that a main polymer chain in the polymer electrolyte membrane was not changed and modified even though the polymer electrolyte membrane had a hydrophobic treatment.

Figure 9:
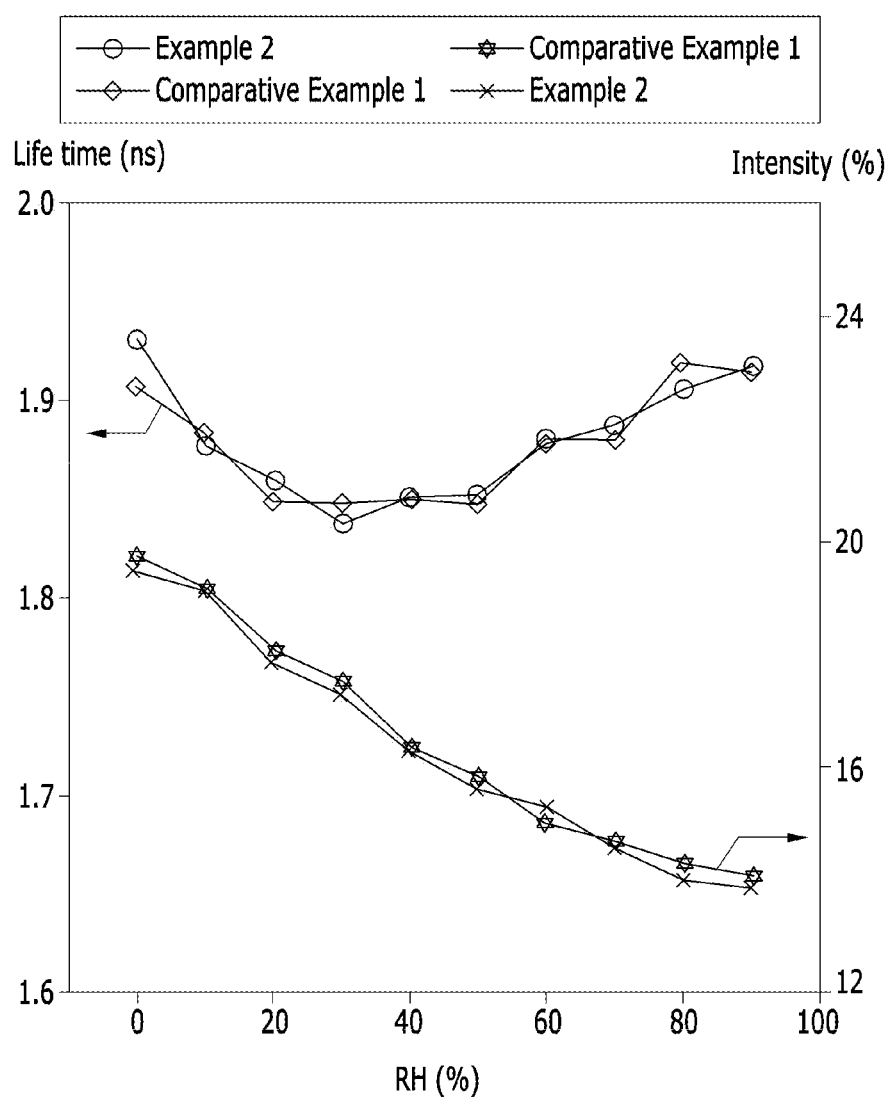
FIG. 9 is a graph showing hydrophilic ion transfer channel distribution inside the polymer electrolyte membranes according to Example 2 and Comparative Example 1 through positron annihilation lifetime and intensity measurement results of the polymer electrolyte membranes.

In addition, positron annihilation lifetime (PAL) and intensity of the polymer electrolyte membranes according to Example 2 and Comparative Example 1 were measured while relative humidity (RH) was changed, and the results are provided in FIG. 9. Herein, the positron annihilation lifetime (PAL) indicates the size of an ion conductive hydrophilic channel, and the longer the positron annihilation lifetime (PAL) is, the larger the size is. In addition, the intensity indicates the number of pores existing in the entire hydrophilic ion channel. Accordingly, as the humidity is increased, a hydration process in which a water molecule fills a nanosized ion conductive channel proceeded and tended to reduce an empty space in the pore in a polymer matrix and decrease the size of the pore. This tendency is interpreted as an index indirectly showing morphology and proton channel distribution inside a polymer electrolyte membrane. As shown in FIG. 9, the polymer electrolyte membrane obtained by hydrophobic treatments 20 times according to Example 2 and the polymer electrolyte membrane obtained by no hydrophobic treatment according to Comparative Example 1 showed almost the same positron annihilation lifetime (PAL) and intensity. In addition, based on the result of FIG. 9, the polymer electrolyte membrane obtained by hydrophobic treatments 20 times according to Example 2 showed the same size and distribution of ion conductive water channels as the polymer electrolyte membrane obtained by no hydrophobic treatment according to Comparative Example 1, and thus no internal morphology change.

Surface of Polymer Electrolyte Membrane

Figure 10:
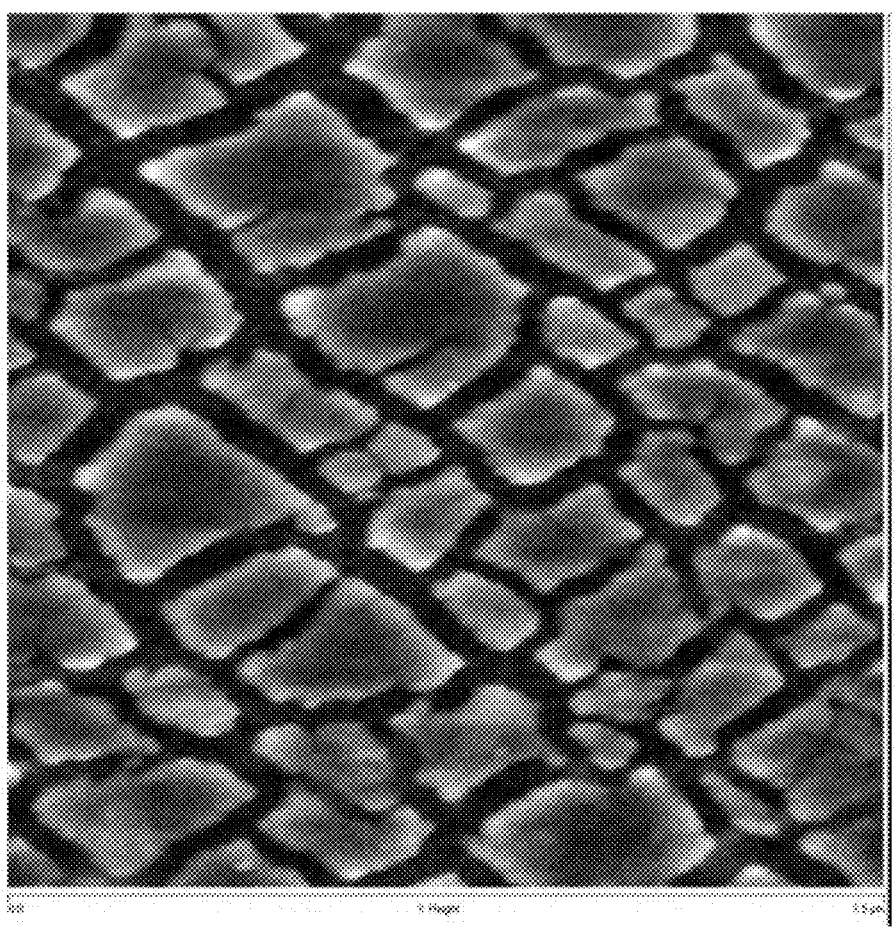
FIG. 10 is an AFM topology image showing the surface of a polymer electrolyte membrane in a hydration state according to Example 4.
Figure 11:
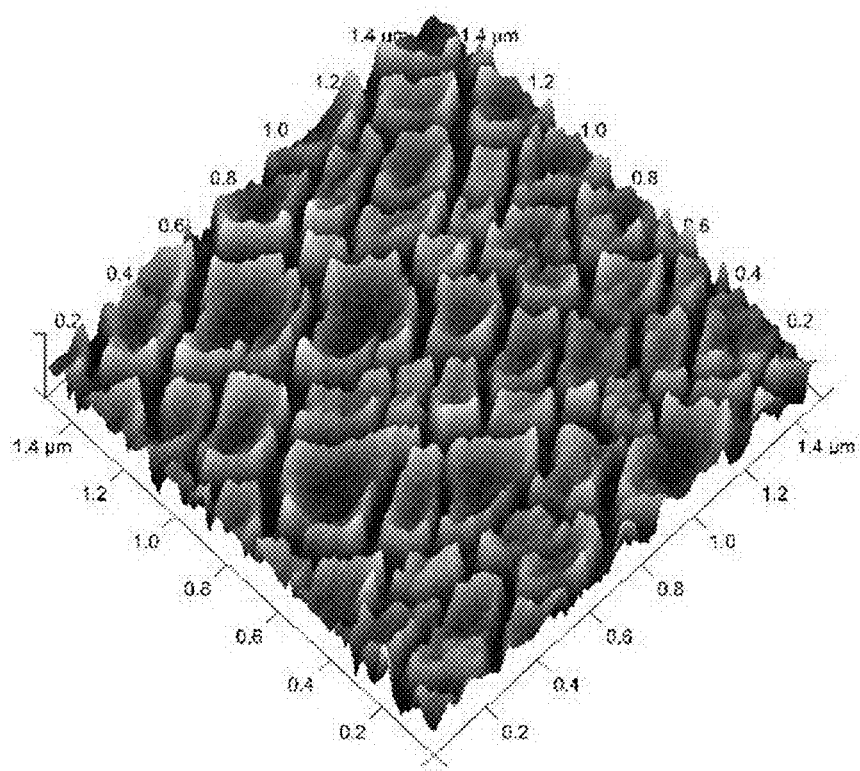
FIG. 11 is a three-dimensional AFM photograph showing the surface of the polymer electrolyte membrane in a hydration state according to Example 4.

An AFM (atomic force microscopy) image of the hydrated surface of the polymer electrolyte membrane according to Example 4 was taken, and is provided in FIG. 10, and a three-dimensional AFM photograph of the polymer electrolyte membrane according to Example 4 is provided in FIG. 11. FIG. 10 showed a crack on the hydrated surface of the polymer electrolyte membrane obtained by performing a hydrophobic treatment, and FIG. 11 showed that the crack had a width of about 25 nm to 40 nm (33 nm) and a depth of 20 nm to 40 nm (31.6 nm).

Figure 12:
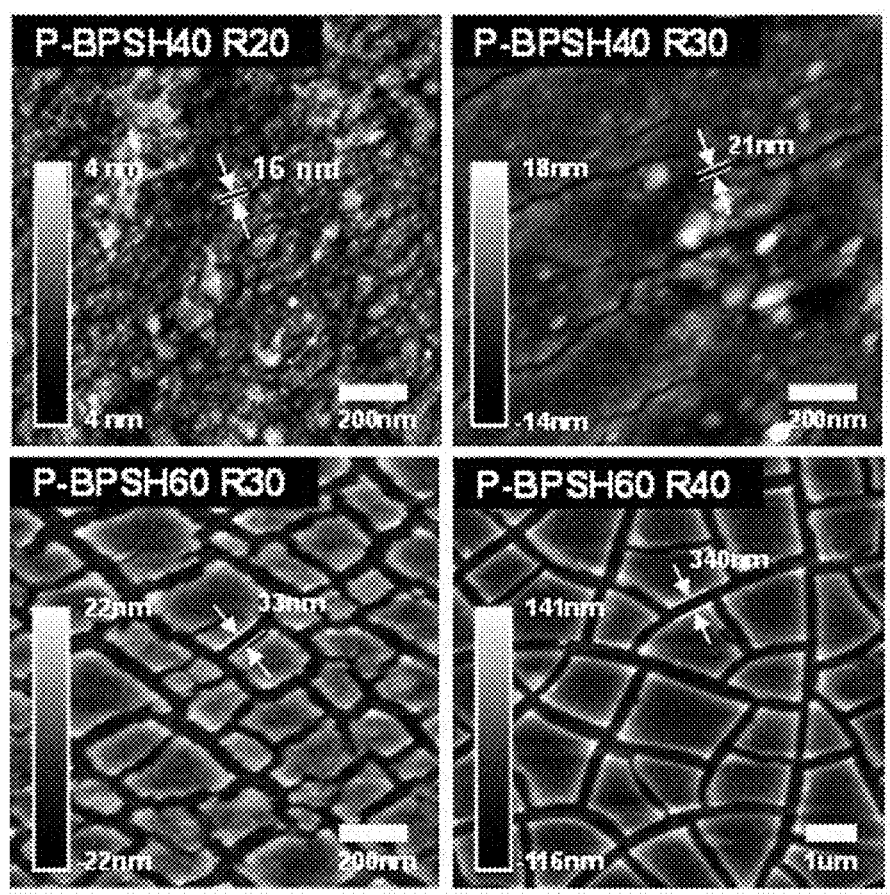
FIG. 12 is an AFM photograph showing the surface of polymer electrolyte membranes according to Examples 2 to 5 after a hydration reaction.
Figure 13:
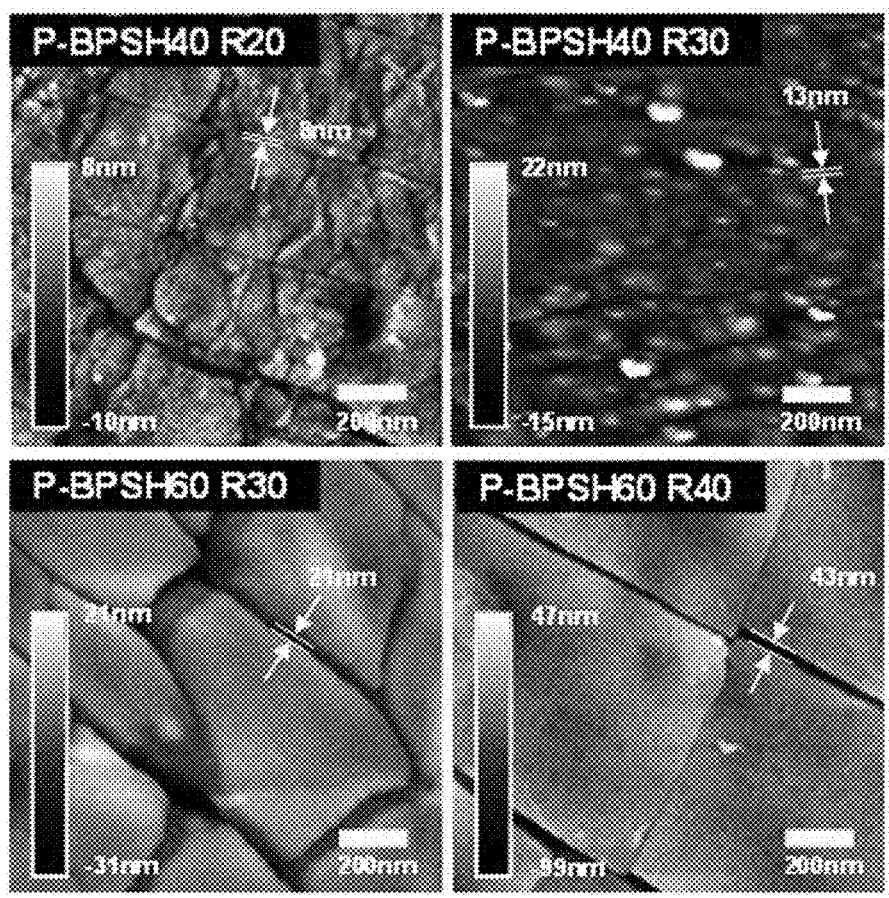
FIG. 13 is an AFM photograph showing the surface of the polymer electrolyte membranes according to Examples 2 to 5 after drying hydrated PEM.

After performing a hydration reaction of the polymer electrolyte membranes according to Examples 2 to 5 and drying them, AFM images were respectively taken of the surface of the polymer electrolyte membranes and are provided in FIG. 12 (after the hydration reaction) and FIG. 13 (after the drying). In FIGS. 12 and 13, P-BPSH40 R20 indicates Example 2, P-BPSH40 R30 indicates Example 3, P-BPSH60 R30 indicates Example 4, and P-BPSH60 R40 indicates Example 5.

As shown in FIG. 12, when the polymer electrolyte membrane was hydrated, the polymer electrolyte membrane was swelled in a different ratio depending on degree of sulfonation (DS), and thus various morphology cracks were generated on a hydrophobic coating layer. As for Example 2 (treatment 20 times) and Example 3 (treatment 30 times), a crack generated during hydration was extended to be 15 nm to 30 nm wide depending on the number of plasma treatments. In addition, Examples 4 and 5 had wider cracks of 30 nm to 60 nm during hydration due to a high swelling ratio of a polymer resin and the number of more plasma treatments that recover, and particularly when the treatment was increased from 30 times to 40 times, the crack become larger to have a depth of 250 nm and a width of 350 nm.

As shown in FIG. 13, the crack extended during hydration contracted after drying while the crack maintained the morphology, and resultantly, the crack was partially closed. The polymer electrolyte membranes according to Example 2 (20 times treatments) and Example 3 (30 times treatments) showed a contracted crack having a width of 5 nm to 15 nm width when dried after hydration. The polymer electrolyte membranes according to Example 4 (30 treatments) and Example 5 (40 treatments) showing a higher swelling ratio during hydration showed a 20 nm to 50 nm-wide crack, and the crack was expanded to be 33 nm to 340 nm wide during hydration but adjusted depending on external drying conditions.

Retarded Desorption Property of Polymer Electrolyte Membrane

Figure 14:
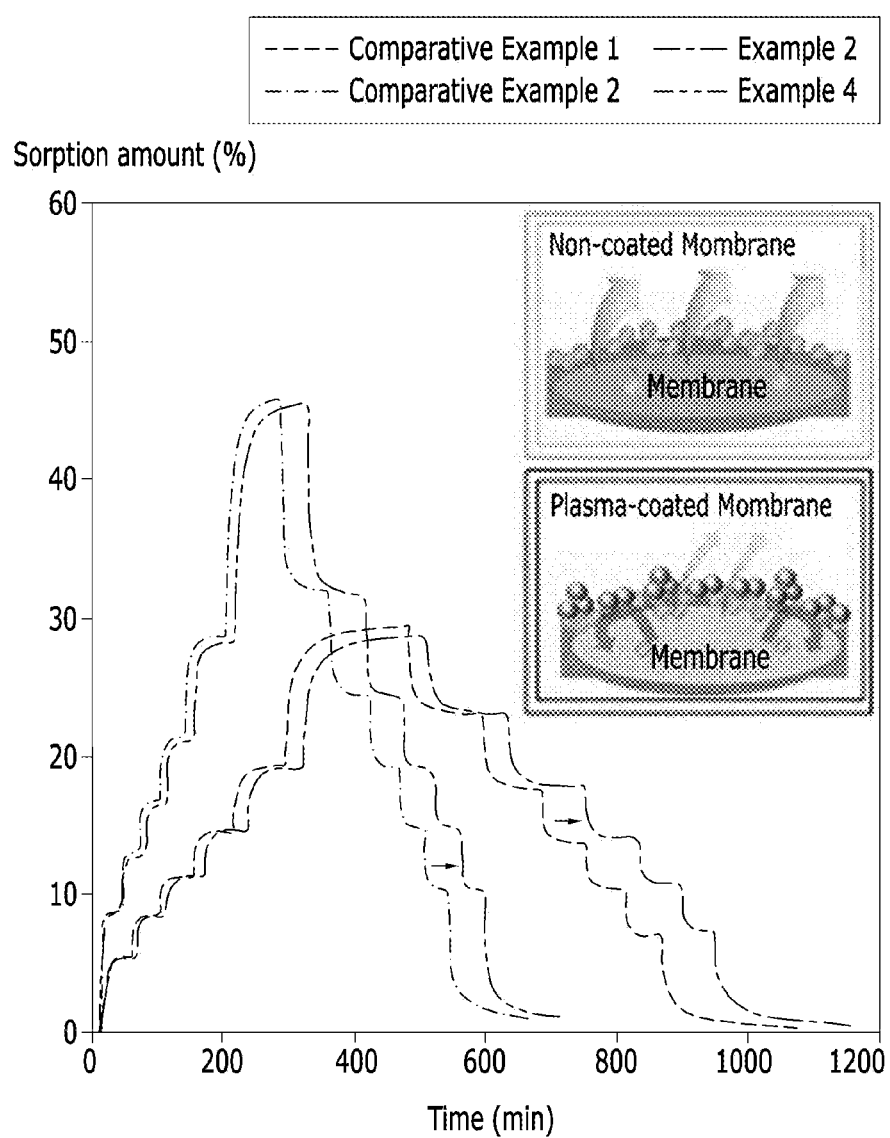
FIG. 14 is a graph showing dynamic vapor sorption (DVS) measurement results of the polymer electrolyte membranes according to Examples 2 and 4 and Comparative Examples 1 and 2.

In order to measure water sorption degree of the polymer electrolyte membranes according to Examples 2 and 4 and Comparative Examples 1 and 2, a dynamic vapor sorption (DVS) experiment of the polymer electrolyte membranes according to Examples 2 and 4 and Comparative Examples 1 and 2 was performed, and the results are provided in FIG. 14. In addition, a pulsatile dynamic vapor sorption (DVS) experiment of the polymer electrolyte membranes according to Example 2 and Comparative Example 1 was performed, and the results are provided in FIG. 15, while a pulsatory dynamic vapor sorption (DVS) experiment of the polymer electrolyte membranes according to Example 4 and Comparative Example 2 was performed, and the results are provided in FIG. 16.

The dynamic vapor sorption (DVS) was measured by using a surface measurement system, and an absorption and dehydration diffusion coefficient on the interface between inside and outside of a polymer electrolyte membrane was calculated by gradually measuring time taken until a water uptake ratio changed in a range of 0% RH to 90% RH at 25° C. and reached a steady state in a sorption/desorption isotherm. In other words, the surface measurement system was used to measure time until sorption/desorption had equilibrium and reached a steady water content at 25° C. at a steady temperature by increasing relative humidity by 10% per step to examine sorption behavior up to 90%. Likewise, dehydration behavior of the polymer electrolyte membrane under a dry condition was recorded while decreasing relative humidity from 90% to 0%. When the sorption/desorption was regarded as one cycle, the cycle was repeated several times to record retarded elapse time depending on diffusion coefficient difference of a water molecule.

Figure 15:
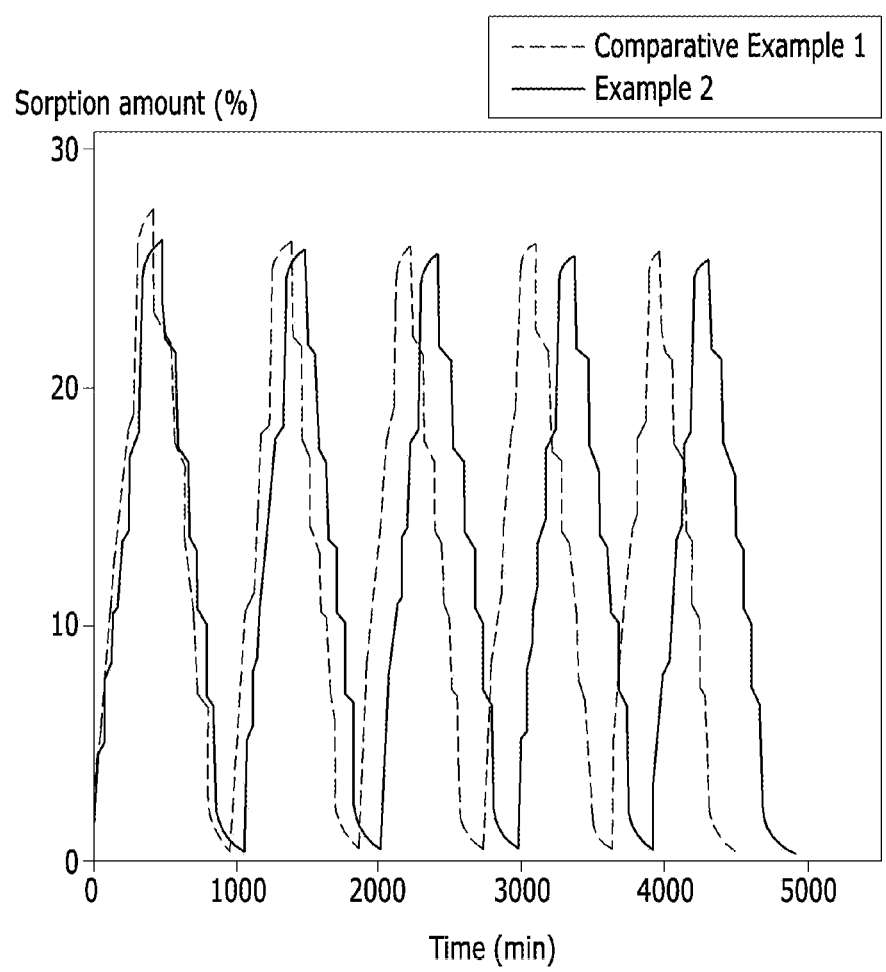
FIG. 15 is a graph showing pulsatile dynamic vapor sorption (DVS) measurement results of the polymer electrolyte membranes according to Example 2 and Comparative Example 1.
Figure 16:
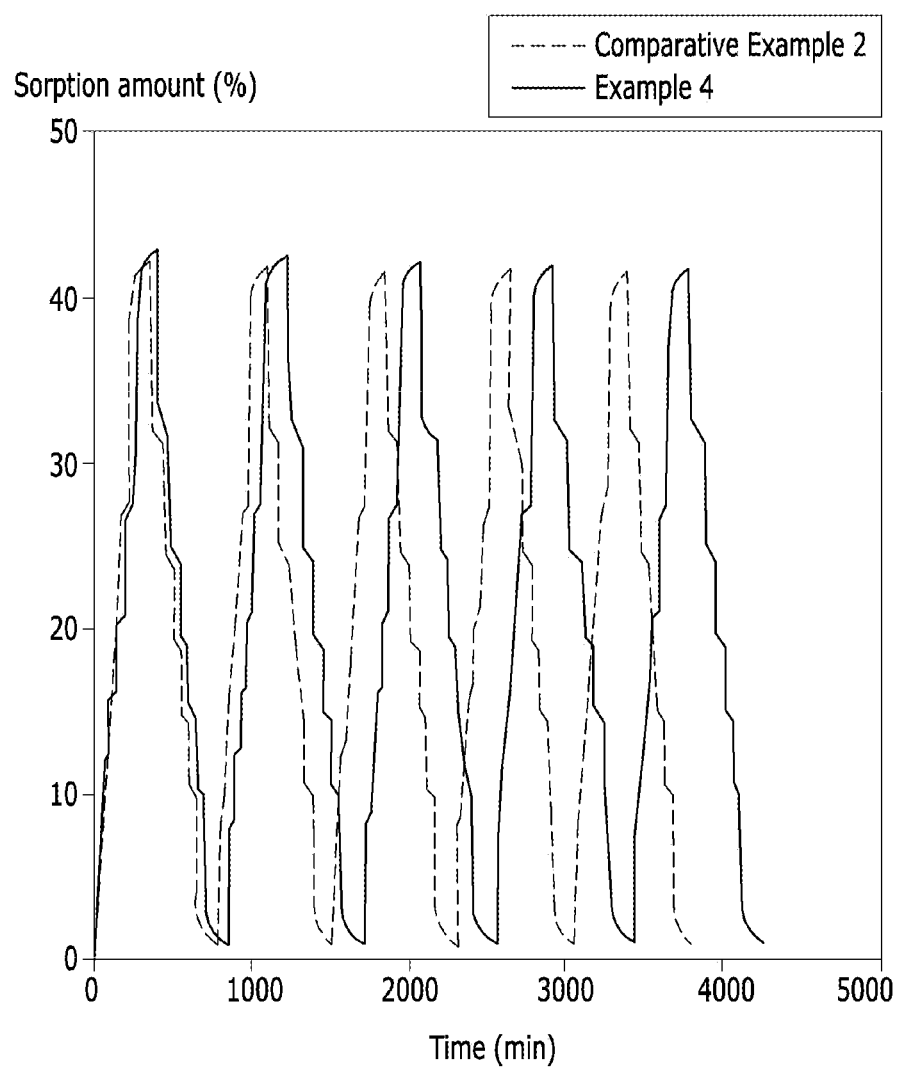
FIG. 16 is a graph showing pulsatile dynamic vapor sorption measurement results of the polymer electrolyte membranes according to Example 4 and Comparative Example 2.

As shown in FIGS. 14, 15, and 16, the polymer electrolyte membranes obtained by a hydrophobic treatment according to Examples 2 and 4 showed a similar adsorption speed to the polymer electrolyte membranes obtained by no hydrophobic treatment according to Comparative Examples 1 and 2, but had retarded dehydration due to a lower diffusion coefficient during dehydration (desorption) and maintained water a little longer. In other words, a hydrophobic thin coating layer formed by a hydrophobic treatment may somewhat suppress dehydration and drying of the polymer electrolyte membrane.

As shown in FIGS. 15 and 16, the polymer electrolyte membranes obtained by a hydrophobic treatment according to Examples 2 and 4 maintained water somewhat longer than the polymer electrolyte membranes obtained by no hydrophobic treatment according to Comparative Examples 1 and 2. In other words, a hydrophobic thin coating layer formed by the hydrophobic treatment somewhat suppressed dehydration and drying of the polymer electrolyte membrane. This retarded desorption maintained the polymer electrolyte membrane without breaking crack morphology on the hydrophobic coating layer despite repeated swelling of the polymer electrolyte membrane due to repeated humidifying and drying. The reason is that long-term durability was improved by securing excellent durability of the plasma coating layer.

Maximum Power Density

Figure 17:
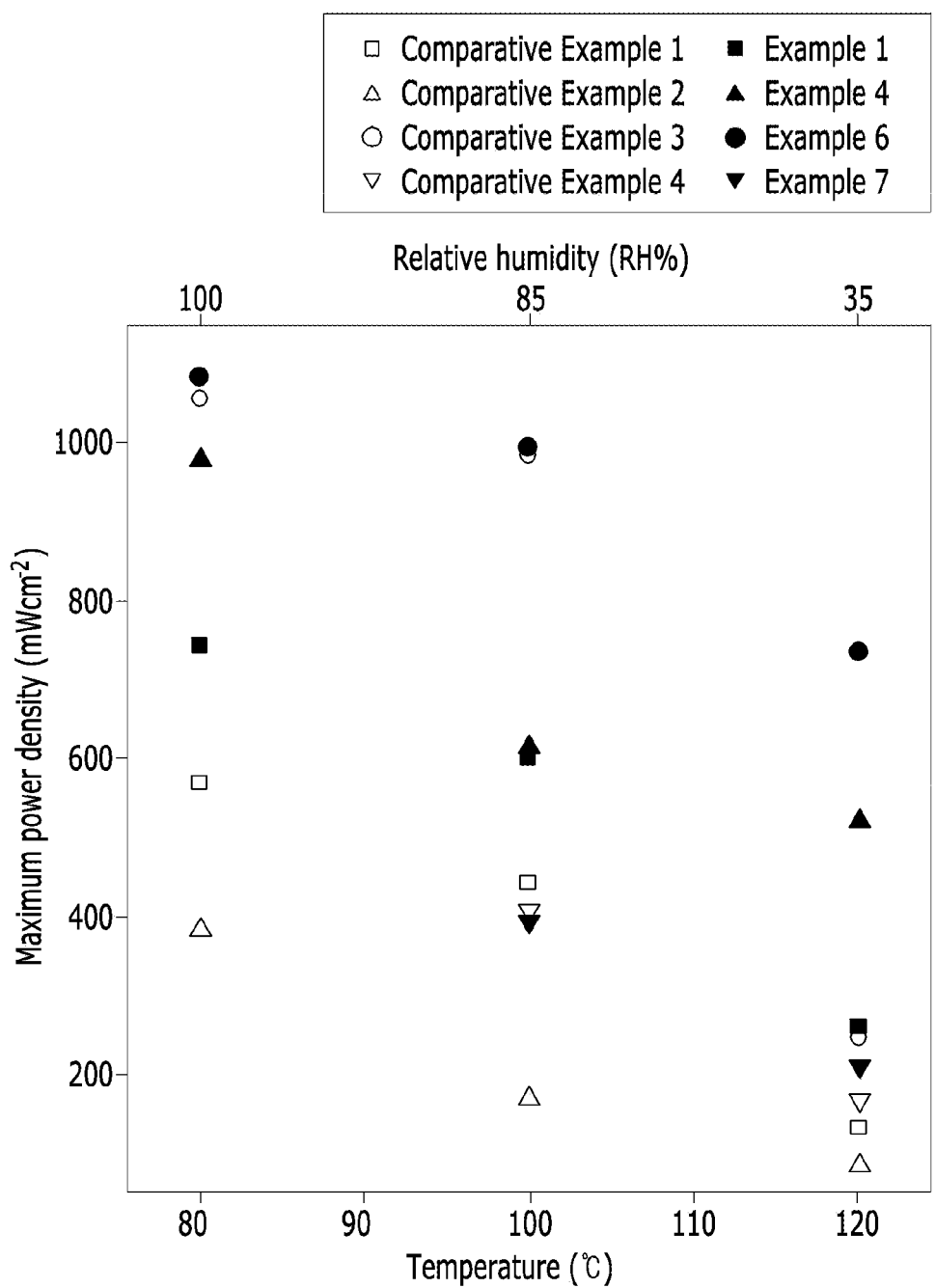
FIG. 17 is a graph showing maximum power density of the polymer electrolyte membranes according to Examples 1, 4, 6, and 7 and Comparative Examples 1 to 4.

The maximum power density of the polymer electrolyte membranes according to Examples 1, 4, and 6 and Comparative Examples 1 to 3 was measured under three conditions of a temperature of 80° C. and 100% RH, a temperature of 100° C. and 85% RH, and a temperature of 120° C. and 35% RH. The maximum power density of the polymer electrolyte membranes according to Example 7 and Comparative Example 4 was measured under two conditions of a temperature of 100° C. and 85% RH, and a temperature of 120° C. and 35% RH. The results are shown in FIG. 17. As shown in FIG. 17, the polymer electrolyte membranes according to Examples 1, 4, 6, and 7 exhibited higher maximum power densities, than that according to Comparative Example 1 to 4 under low relative humidity under 85% RH or 35% RH at over 100° C. The polymer electrolyte membrane according to Example 4 showed much enhanced maximum power density than the polymer electrolyte membrane according to Comparative Example 2 under all three different conditions of a temperature of 80° C. and 100% RH, a temperature of 100° C. and 85% RH, and a temperature of 120° C. and 35% RH. Particularly, the polymer electrolyte membrane according to Example 4 achieved the enhanced maximum power density up to 520.7 mWcm$^{-2}$ from 84.3 mWcm$^{-2}$ as almost 6 times than that of the polymer electrolyte membrane according to Comparative Example 2 under a temperature of 120° C. and 35% RH. In especial, the polymer electrolyte membrane according to Example 6 exhibited slightly enhanced power density than that according to Comparative Example 3, under a temperature of 80° C. and 100% RH, a temperature of 100° C. and 85% RH, and that according to Example 6 exhibited almost three times higher maximum power density of 733.5 mWcm$^{-2}$ than that according to Comparative Example 3 under a condition of a temperature of 120° C. and 35% RH. The polymer electrolyte membrane according to Example 7 also enhances the power density over 1.25 times than that according to Comparative Example 4 at a temperature of 120° C. and 35% RH. From these results, it can expected that the plasma-treatment provides the enhanced power density to various types of hydrocarbon aromatic membranes having different polymer morphology of hydrophilic and hydrophobic phase separation, in particular, under low 35% RH at 120° C.

Enhanced Proton Conductivity

Figure 18:
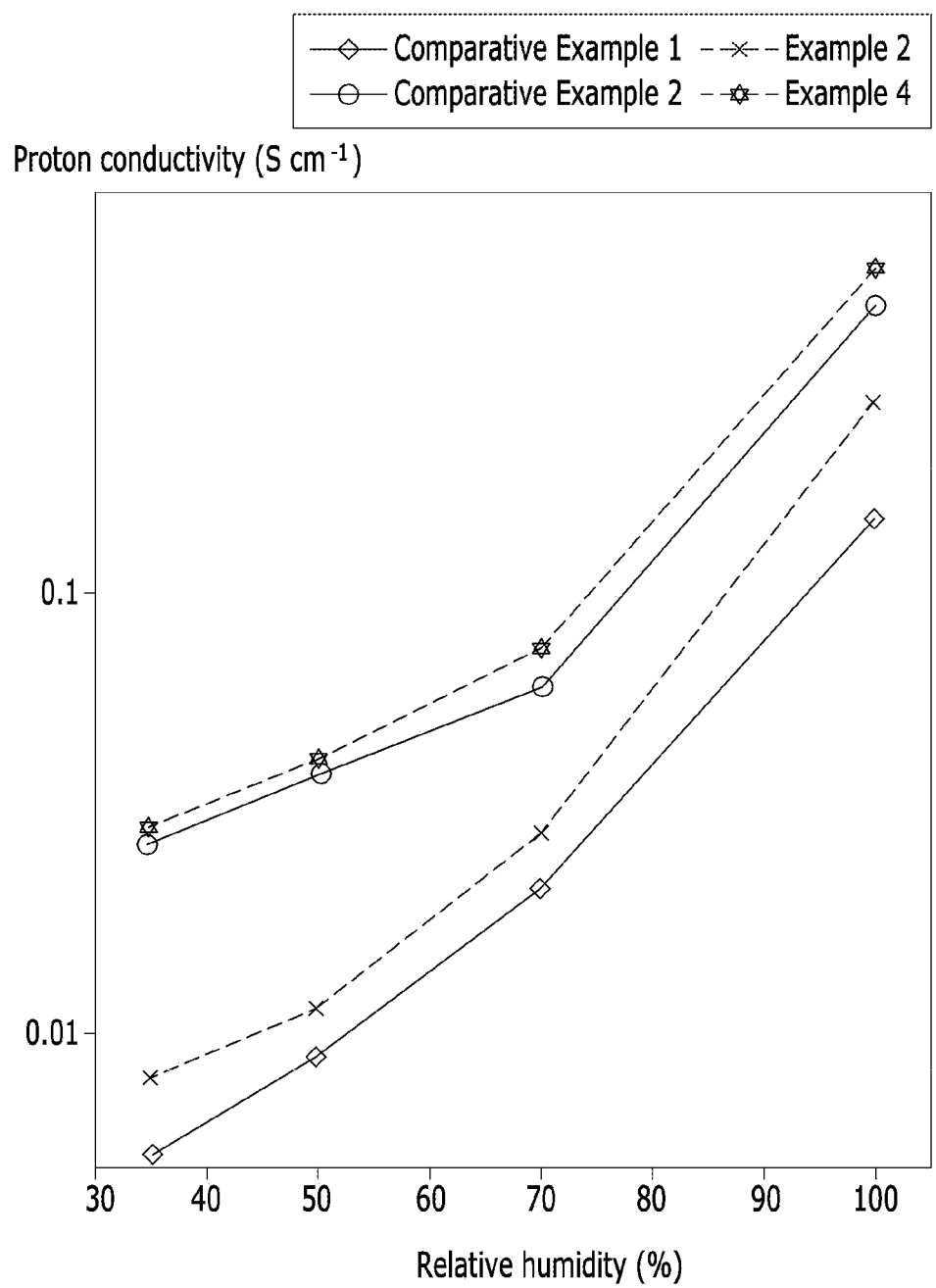
FIG. 18 is a graph showing ion conductivity of the polymer electrolyte membranes according to Examples 2 and 4 and Comparative Examples 1 and 2 at 80° C. under various relative humidities.
Figure 19:
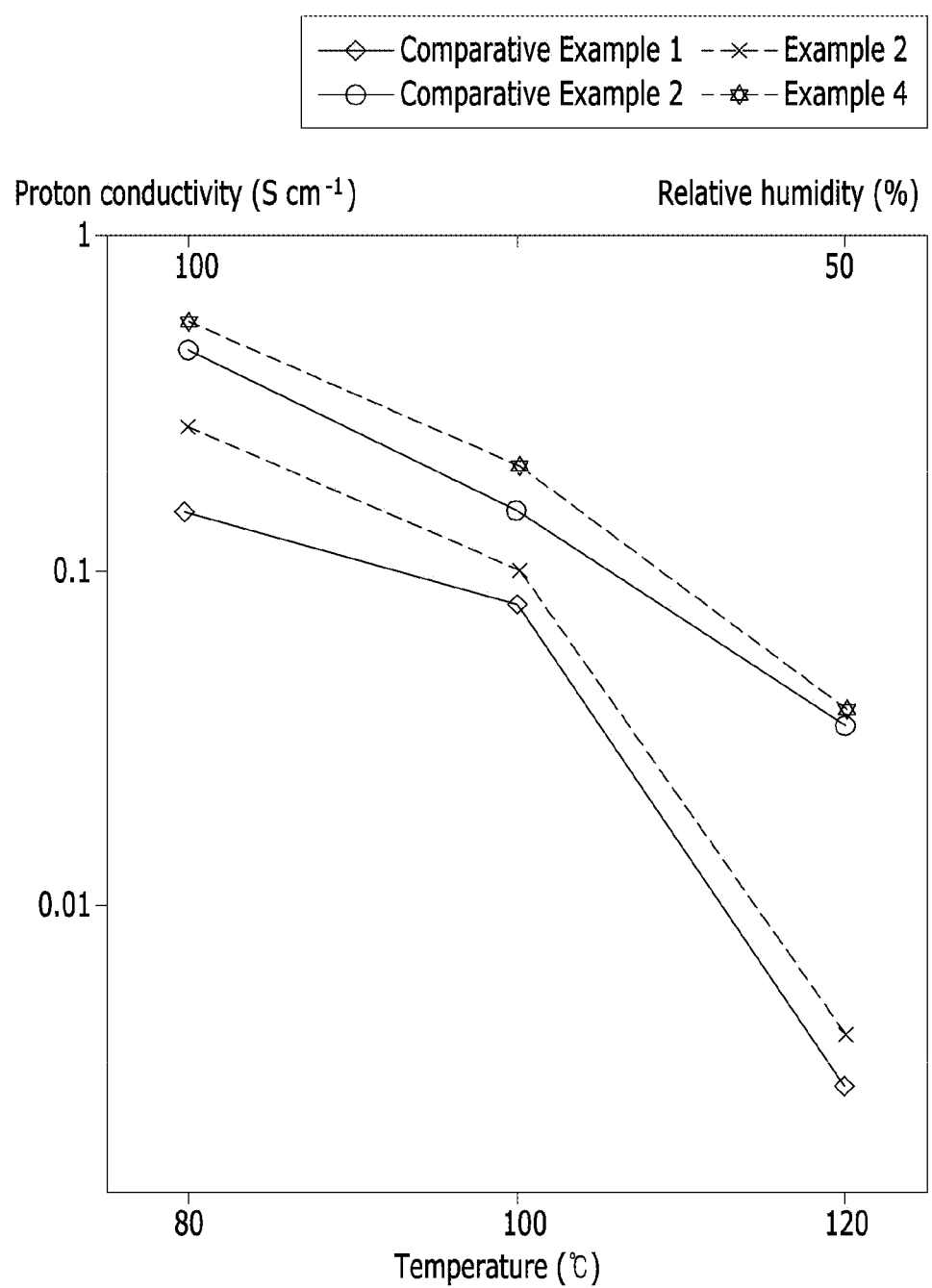
FIG. 19 is a graph showing ion conductivity of the polymer electrolyte membranes according to Examples 2 and 4 and Comparative Examples 1 and 2 at various temperatures (80° C., 100° C., and 120° C.) under various relative humidities.

Ion conductivity of the polymer electrolyte membranes according to Examples 2 and 4 and Comparative Examples 1 and 2 was measured at 80° C. by changing relative humidity, and the results are provided in FIG. 18. In addition, ion conductivity of the polymer electrolyte membranes according to Examples 2 and 4 and Comparative Examples 1 and 2 was measured by changing the temperature and relative humidity, and the results are provided in FIG. 19. As shown in FIGS. 18 and 19, the polymer electrolyte membranes obtained by a hydrophobic treatment according to Examples 2 and 4 showed excellent hydrogen ion conductivity at a high temperature compared with the polymer electrolyte membranes obtained by no hydrophobic treatment according to Comparative Examples 1 and 2.

Single Cell Performance Characteristics

Figure 20A:
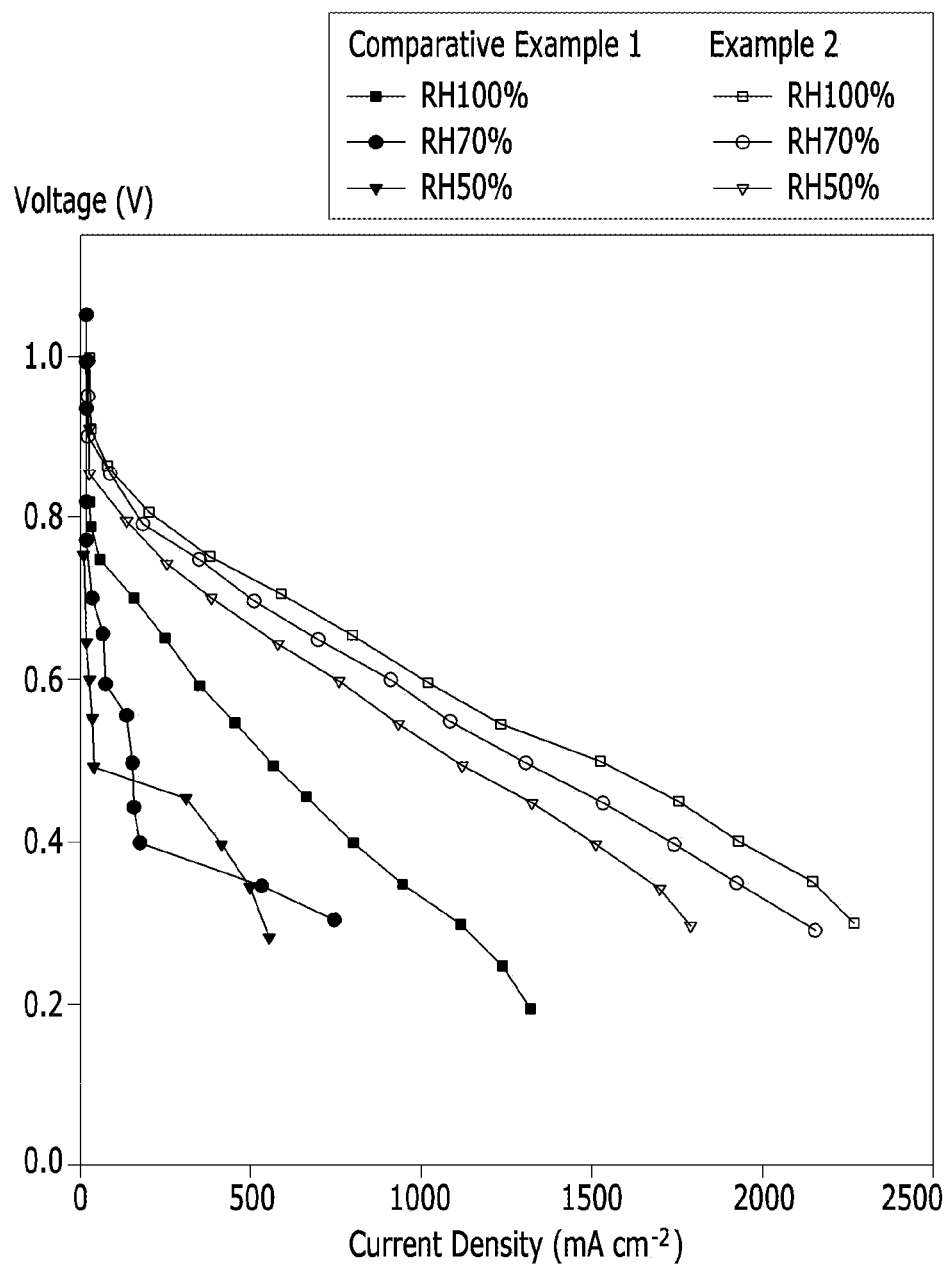
FIG. 20A is a graph showing current density of the polymer electrolyte membranes according to Example 2 and Comparative Example 1 under relative humidity of 100%, 70%, and 50% at 80° C.
Figure 20B:
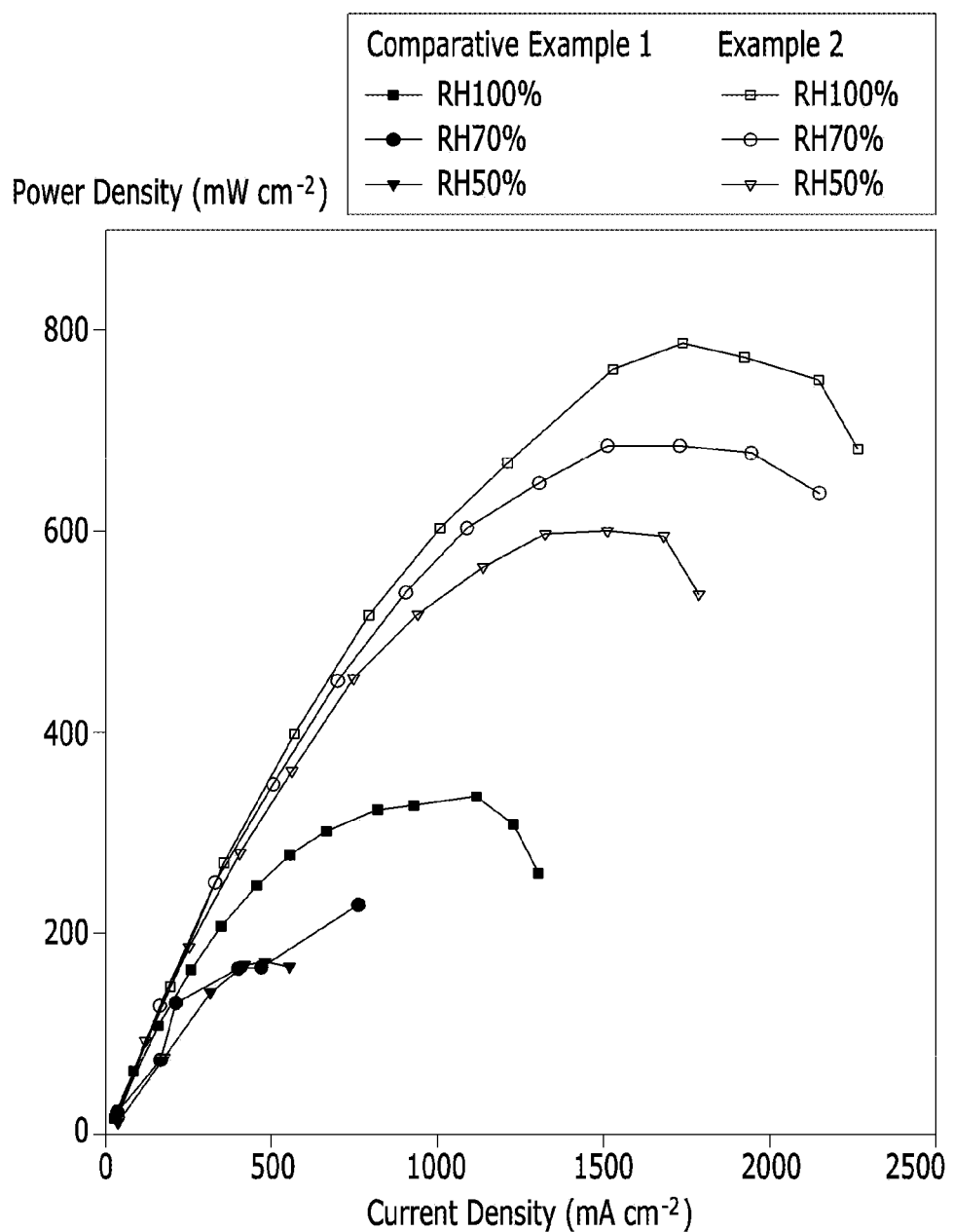
FIG. 20B is a graph showing power density of the polymer electrolyte membranes according to Example 2 and Comparative Example 1 under relative humidity of 100%, 70%, and 50% at 80° C.
Figure 21A:
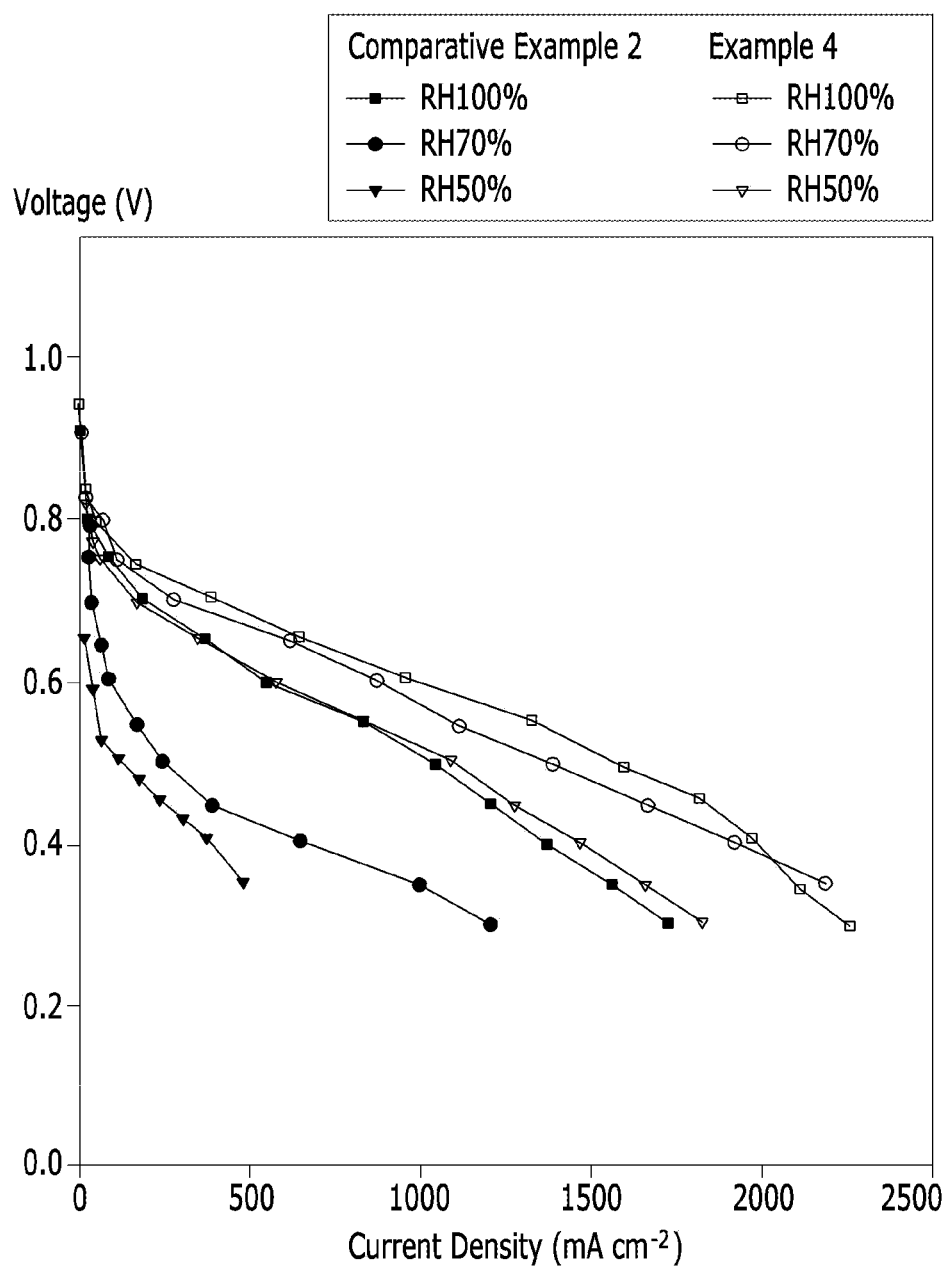
FIG. 21A is a graph showing current density of the polymer electrolyte membrane according to Example 4 and Comparative Example 2 under relative humidity of 100%, 70%, and 50% at 80° C.
Figure 21B:
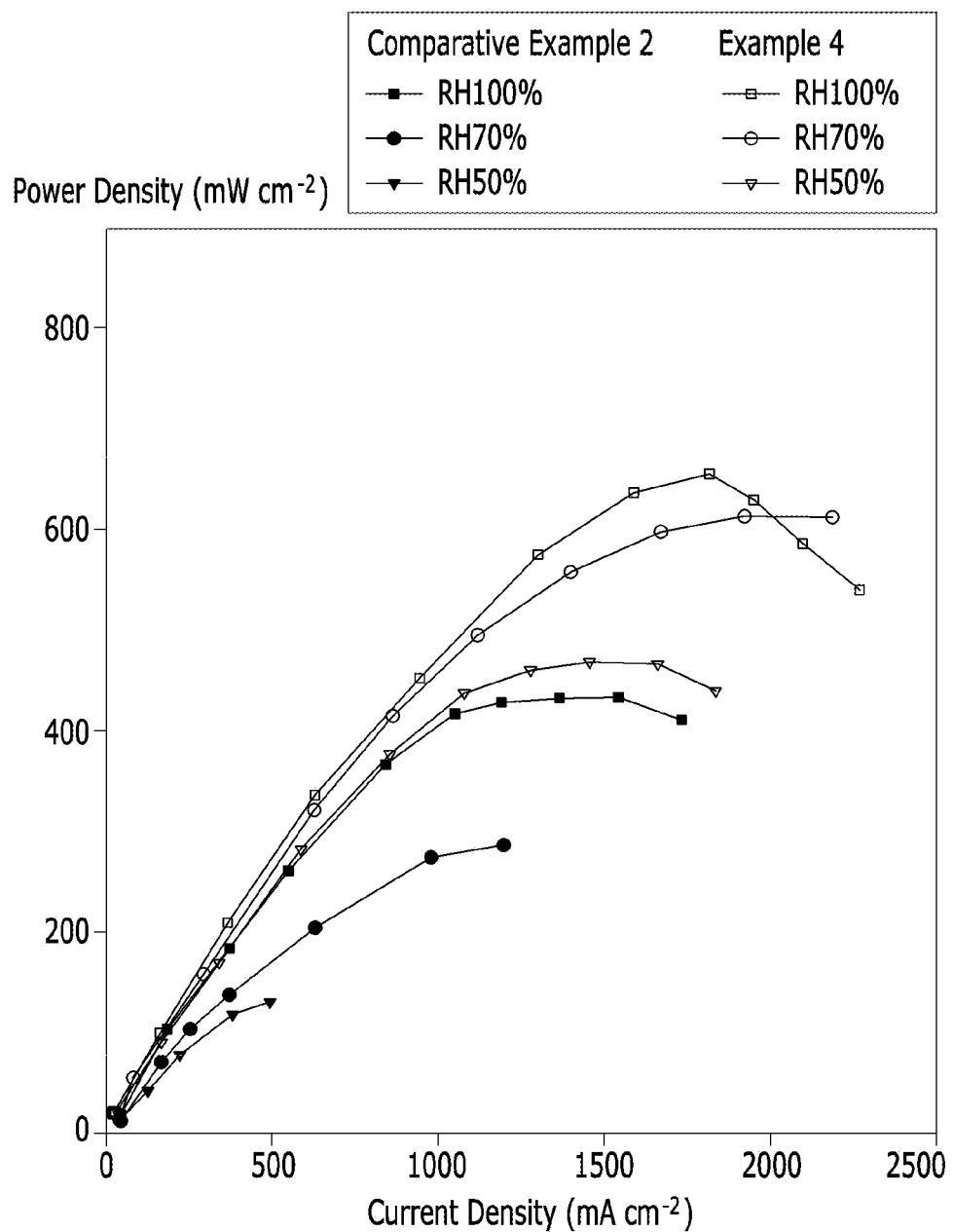
FIG. 21B is a graph showing power density of the polymer electrolyte membrane according to Example 4 and Comparative Example 2 under relative humidity of 100%, 70%, and 50% at 80° C.

Current density and power density of the polymer electrolyte membranes according to Example 2 and Comparative Example 1 were measured under relative humidity condition of 100%, 70%, and 50% at 80° C., and the results are respectively provided in FIGS. 20A and 20B. In addition, current density and power density of the polymer electrolyte membranes according to Example 4 and Comparative Example 2 were measured under relative humidity condition of 100%, 70%, and 50% at 80° C., and the results are respectively provided in FIGS. 21A and 21B.

Figure 22A:
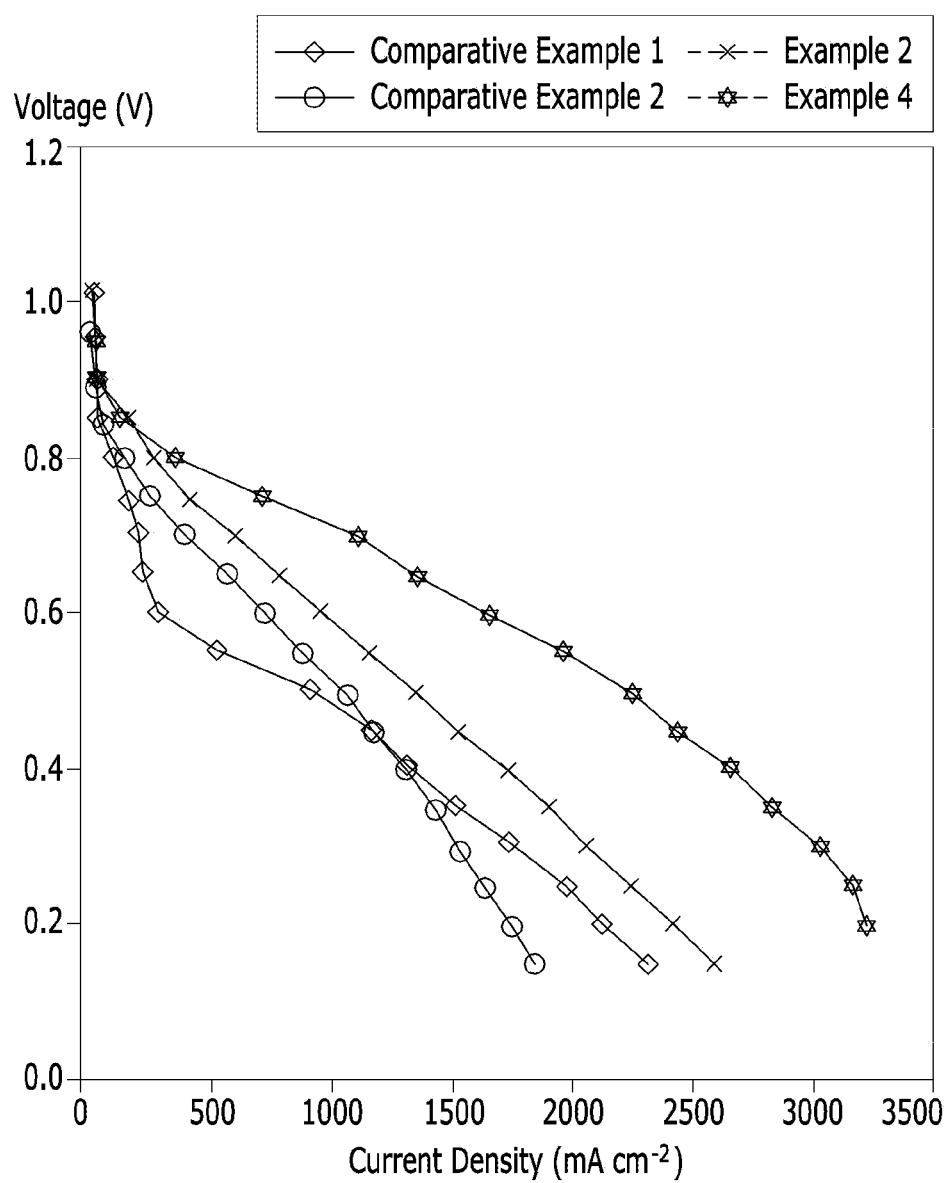
FIG. 22A is a graph showing current density of the polymer electrolyte membranes according to Examples 2 and 4 and Comparative Examples 1 and 2 under relative humidity of 85% at 100° C.
Figure 22B:
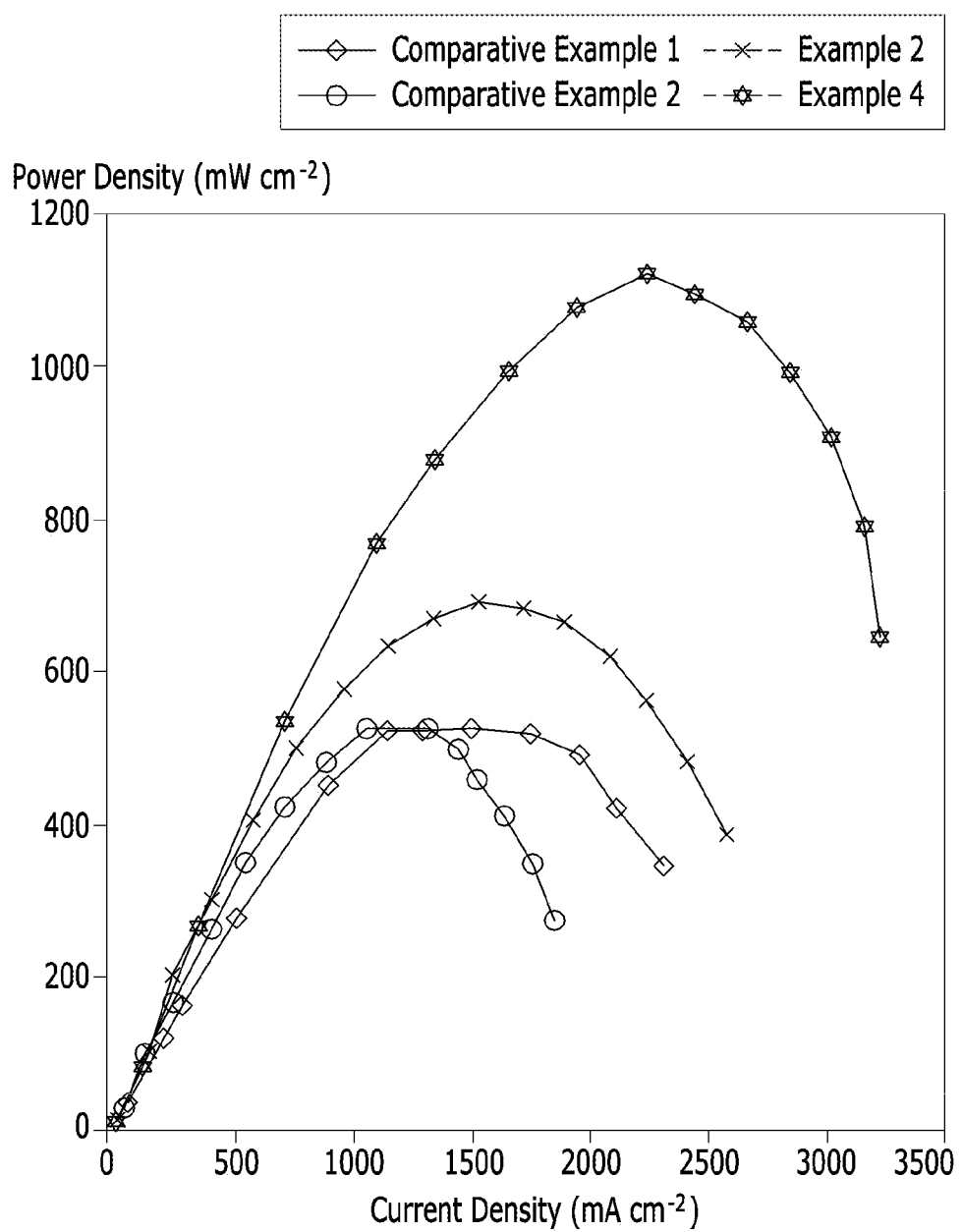
FIG. 22B is a graph showing power density of the polymer electrolyte membranes according to Examples 2 and 4 and Comparative Examples 1 and 2 under relative humidity of 85% at 100° C.
Figure 23A:
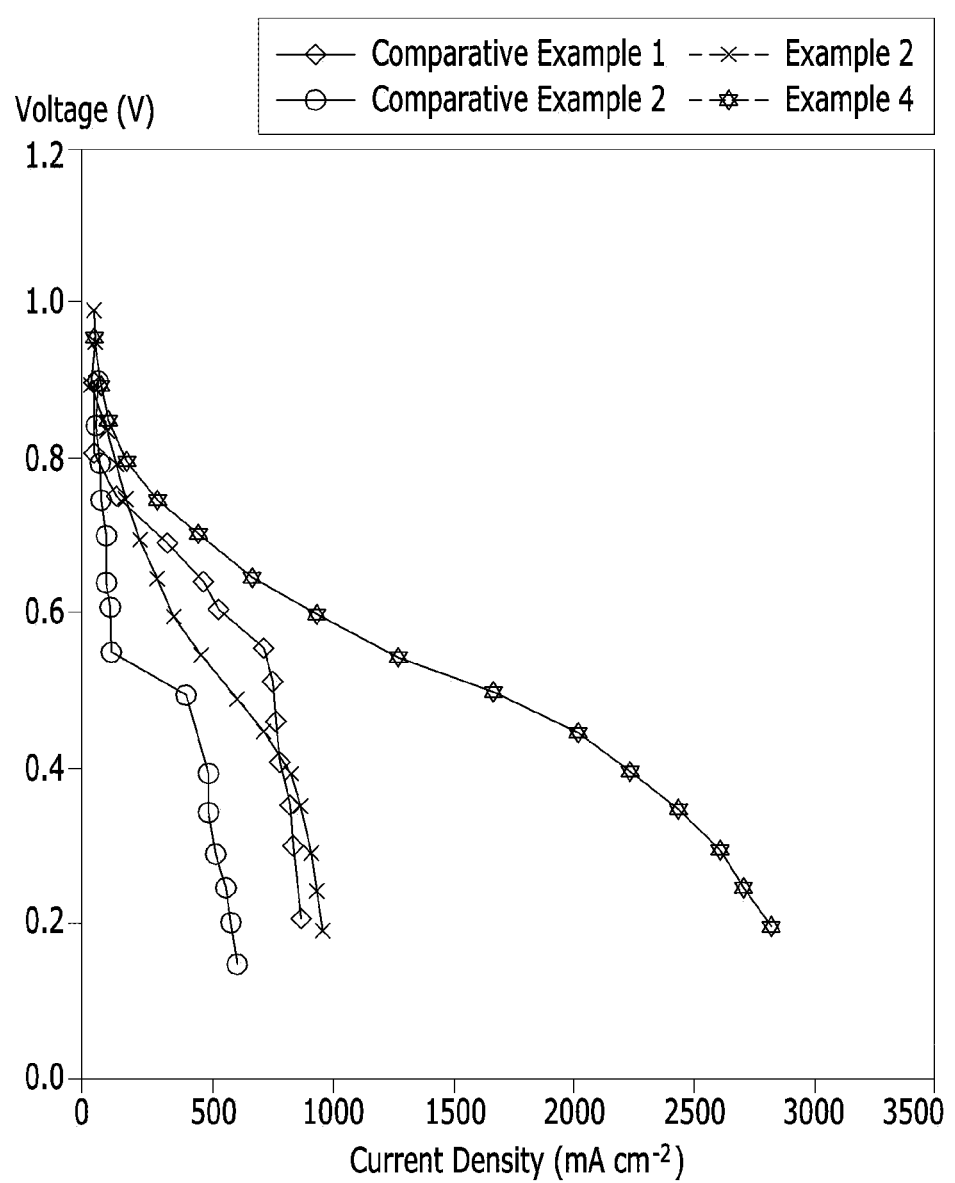
FIG. 23A is a graph showing current density of the polymer electrolyte membranes according to Examples 2 and 4 and Comparative Examples 1 and 2 under relative humidity of 35% at 120° C.
Figure 23B:
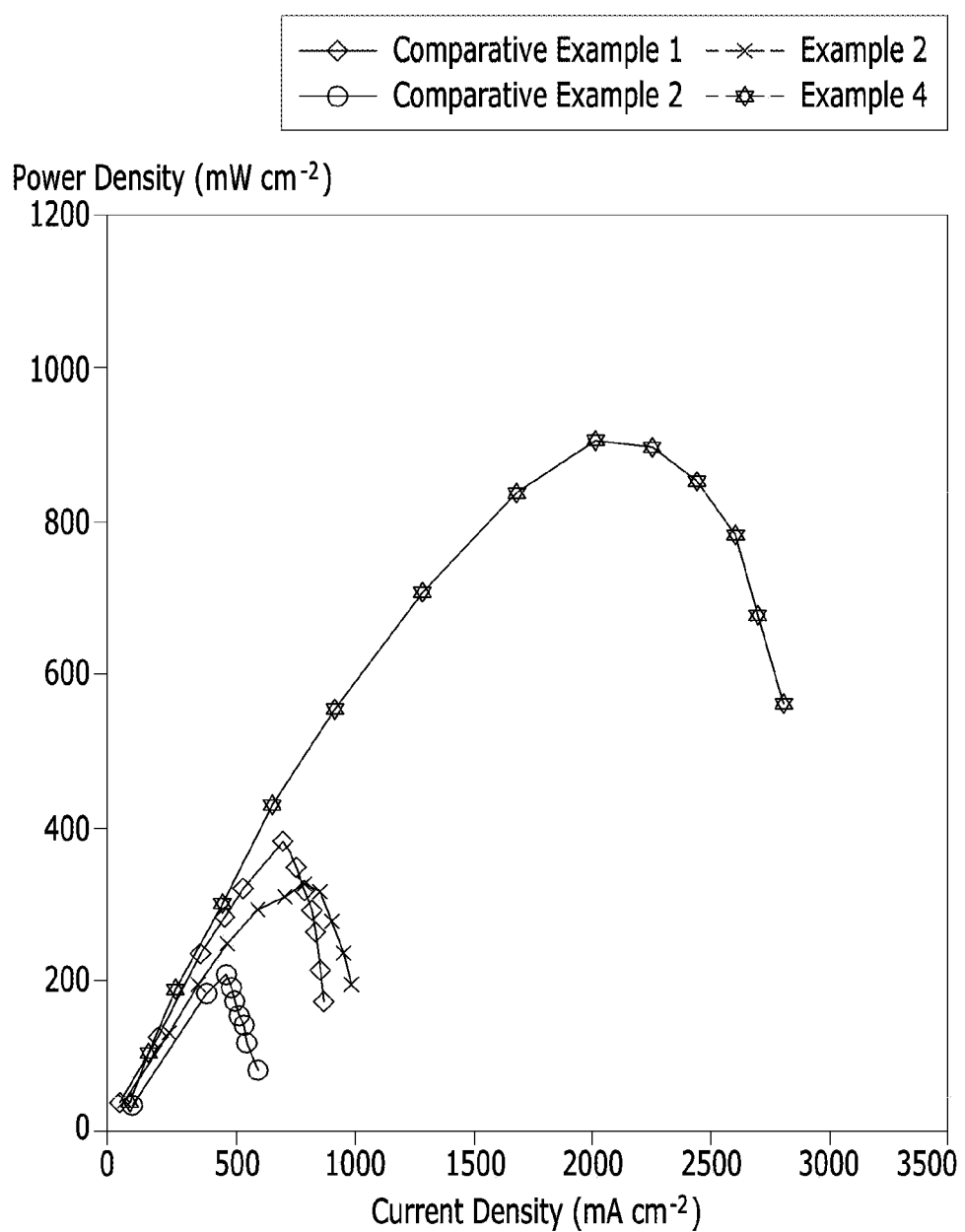
FIG. 23B is a graph showing power density of the polymer electrolyte membranes according to Examples 2 and 4 and Comparative Examples 1 and 2 under relative humidity of 35% at 120° C.

In addition, current density and power density of the polymer electrolyte membranes according to Examples 2 and 4 and Comparative Examples 1 and 2 were measured under relative humidity condition of 85% at 100° C., and the results are respectively provided in FIGS. 22A and 22B. In addition, current density and power density of the polymer electrolyte membranes according to Examples 2 and 4 and Comparative Examples 1 and 2 were measured under relative humidity condition of 35% at 120° C., and the results are respectively provided in FIGS. 23A and 23B.

As shown in FIGS. 20A to 23B, a polymer electrolyte membrane obtained by a hydrophobic treatment showed excellent current density and power density.

Figure 24:
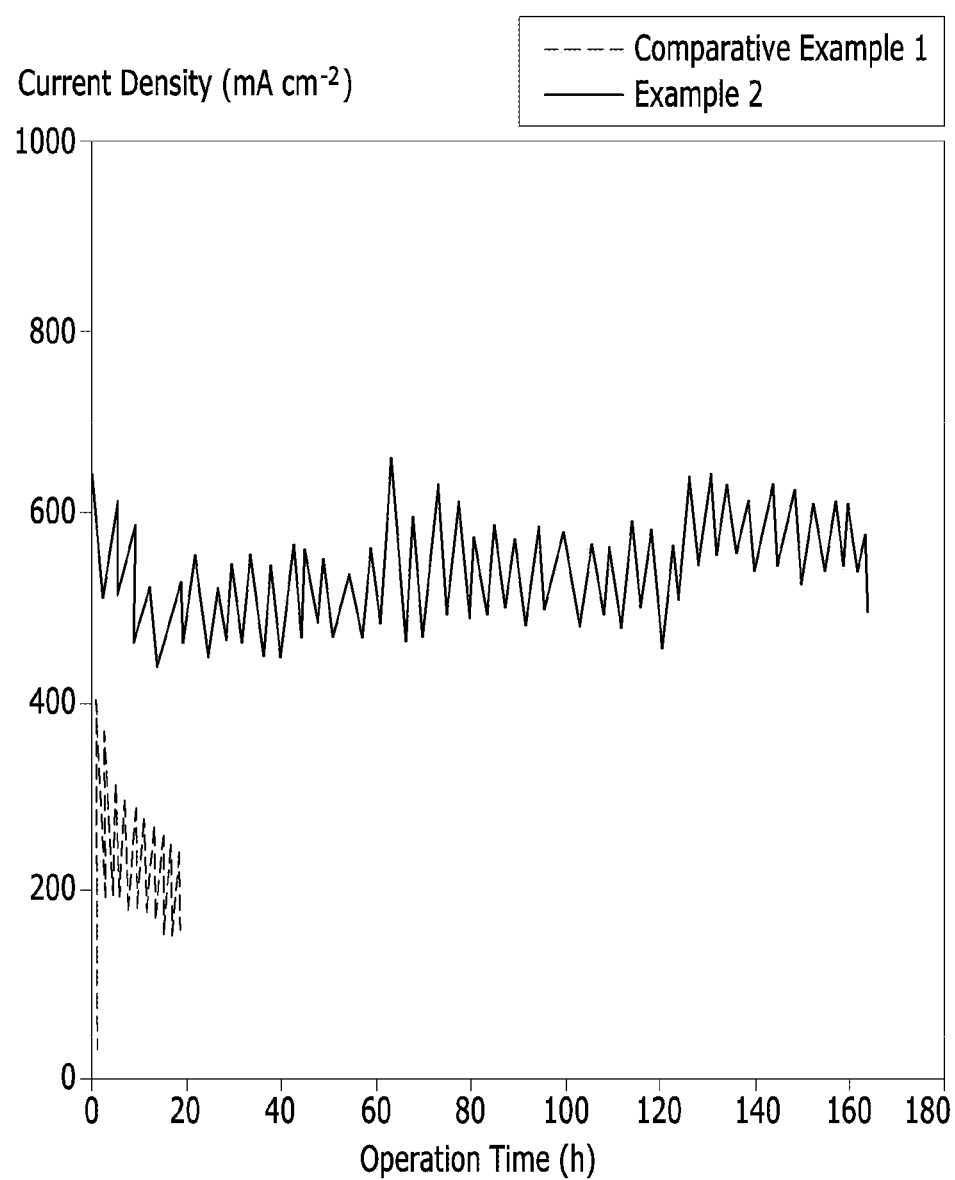
FIG. 24 is a graph showing stability of cells using the polymer electrolyte membranes according to Example 2 and Comparative Example 1 under relative humidity of 50% at 100° C.

In addition, cells using the polymer electrolyte membranes according to Example 2 and Comparative Example 1 were operated at 100° C. under relative humidity of 50%, current density of the cells were measured depending on operation time, and the results are provided in FIG. 24. As shown in FIG. 24, the polymer electrolyte membrane obtained by a hydrophobic treatment according to Example 2 maintained current density after about 180 hours of operation, but the polymer electrolyte membrane obtained by no hydrophobic treatment according to Comparative Example 1 showed sharply deteriorated current density even after about 20 hours of operation.

Figure 25A:
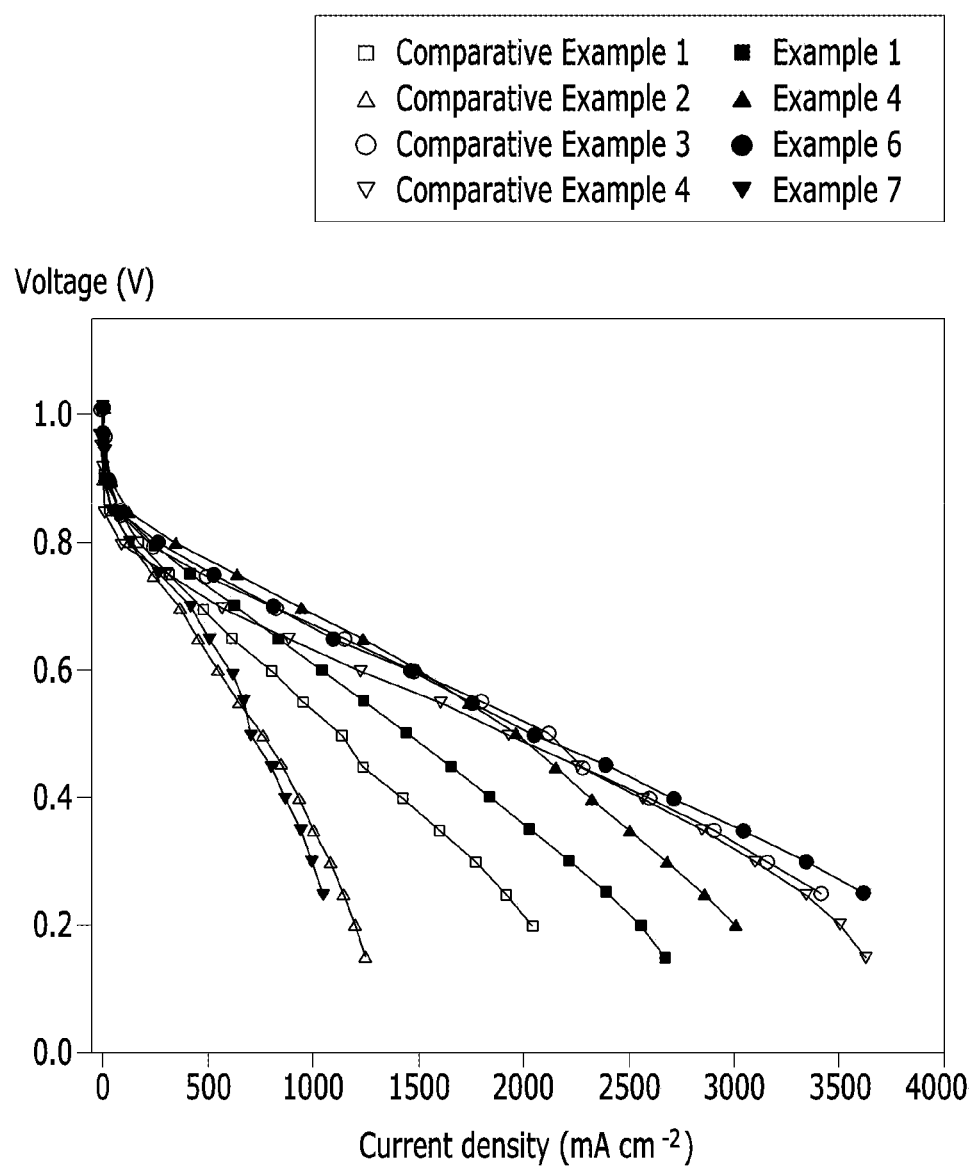
FIG. 25A is a graph showing current density of the polymer electrolyte membranes according to Examples 1, 4, 6 and 7 and Comparative Examples 1 to 4 under relative humidity of 100% at 80° C.
Figure 25B:
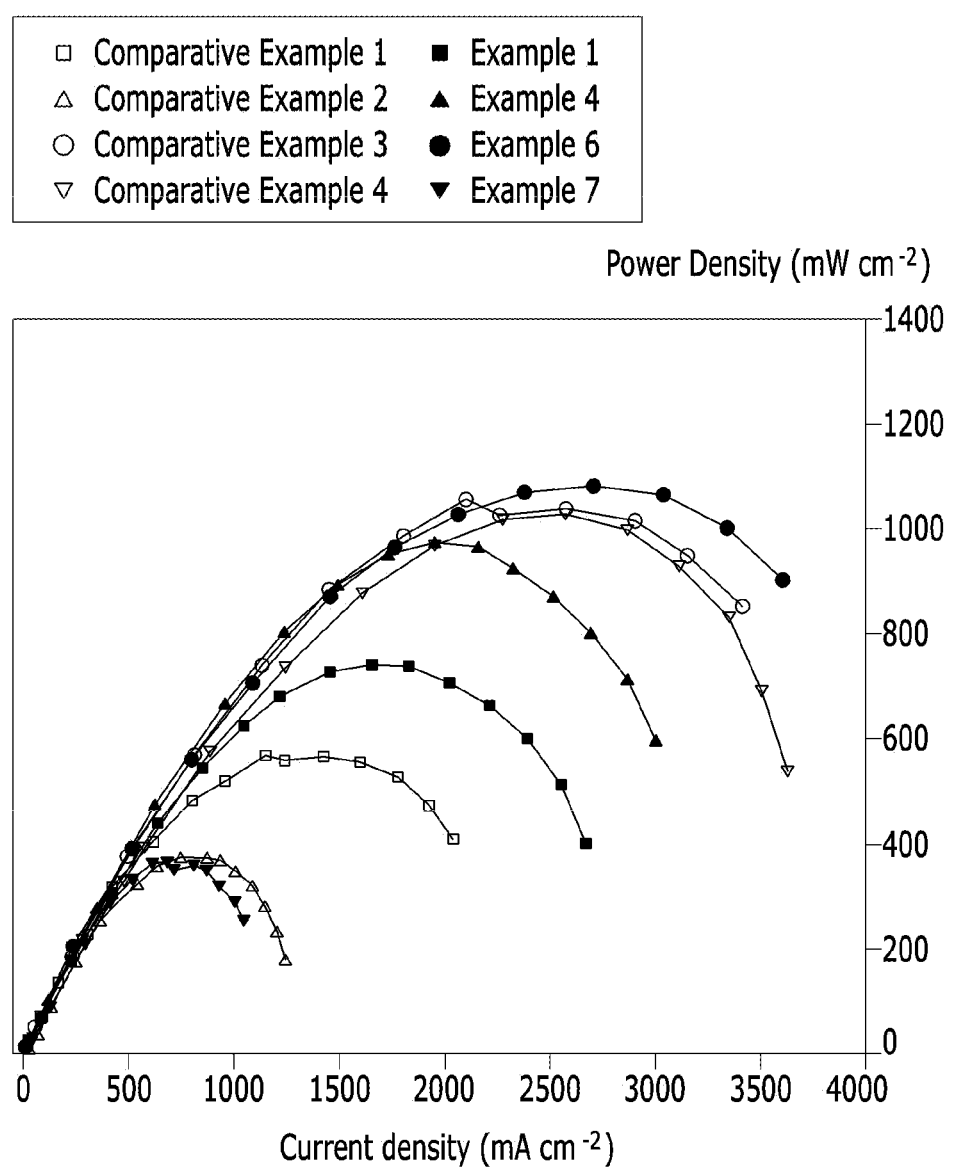
FIG. 25B is a graph showing power density of the polymer electrolyte membranes according to Examples 1, 4, 6 and 7 and Comparative Examples 1 to 4 under relative humidity of 100% at 80° C.
Figure 26A:
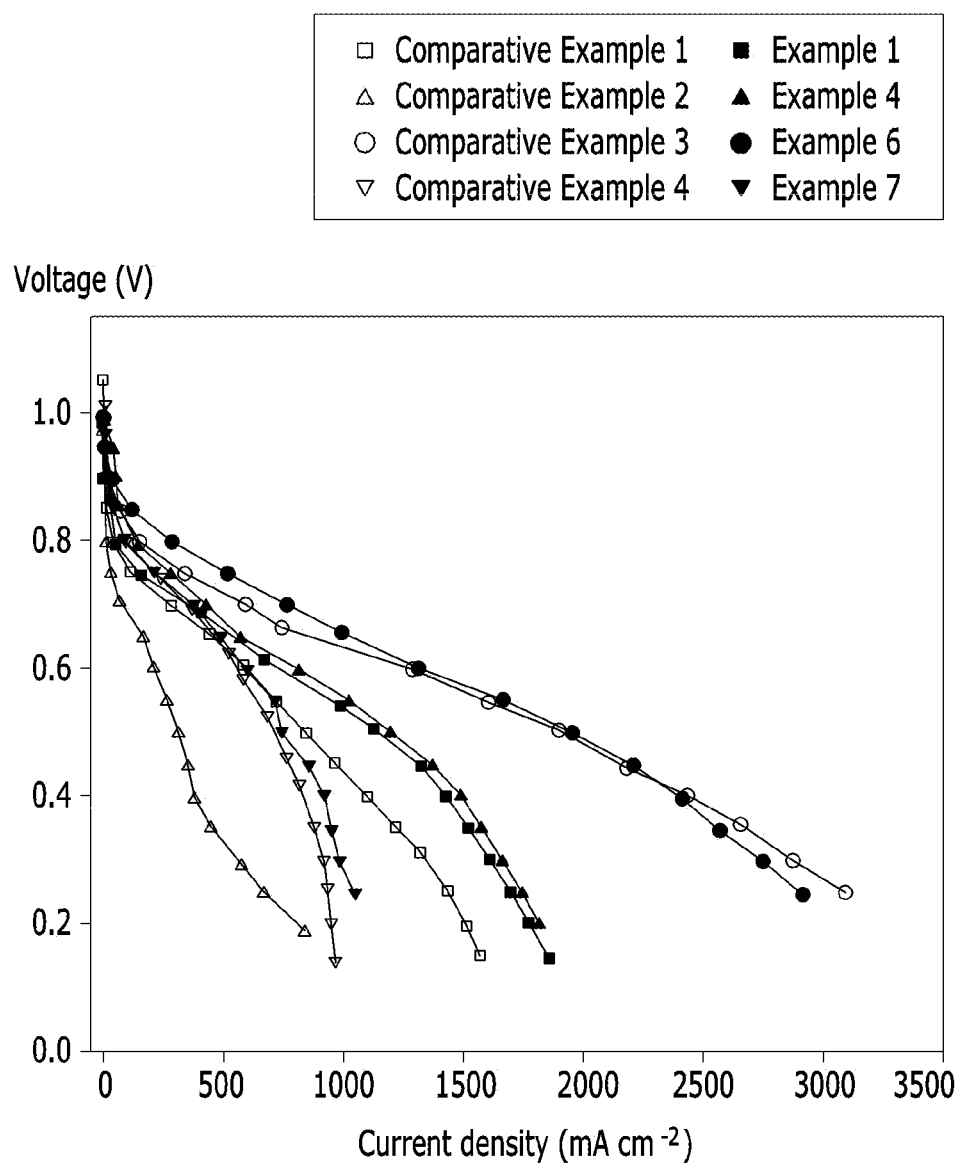
FIG. 26A is a graph showing current density of the polymer electrolyte membranes according to Examples 1, 4, 6 and 7 and Comparative Examples 1 to 4 under relative humidity of 85% at 85° C.
Figure 26B:
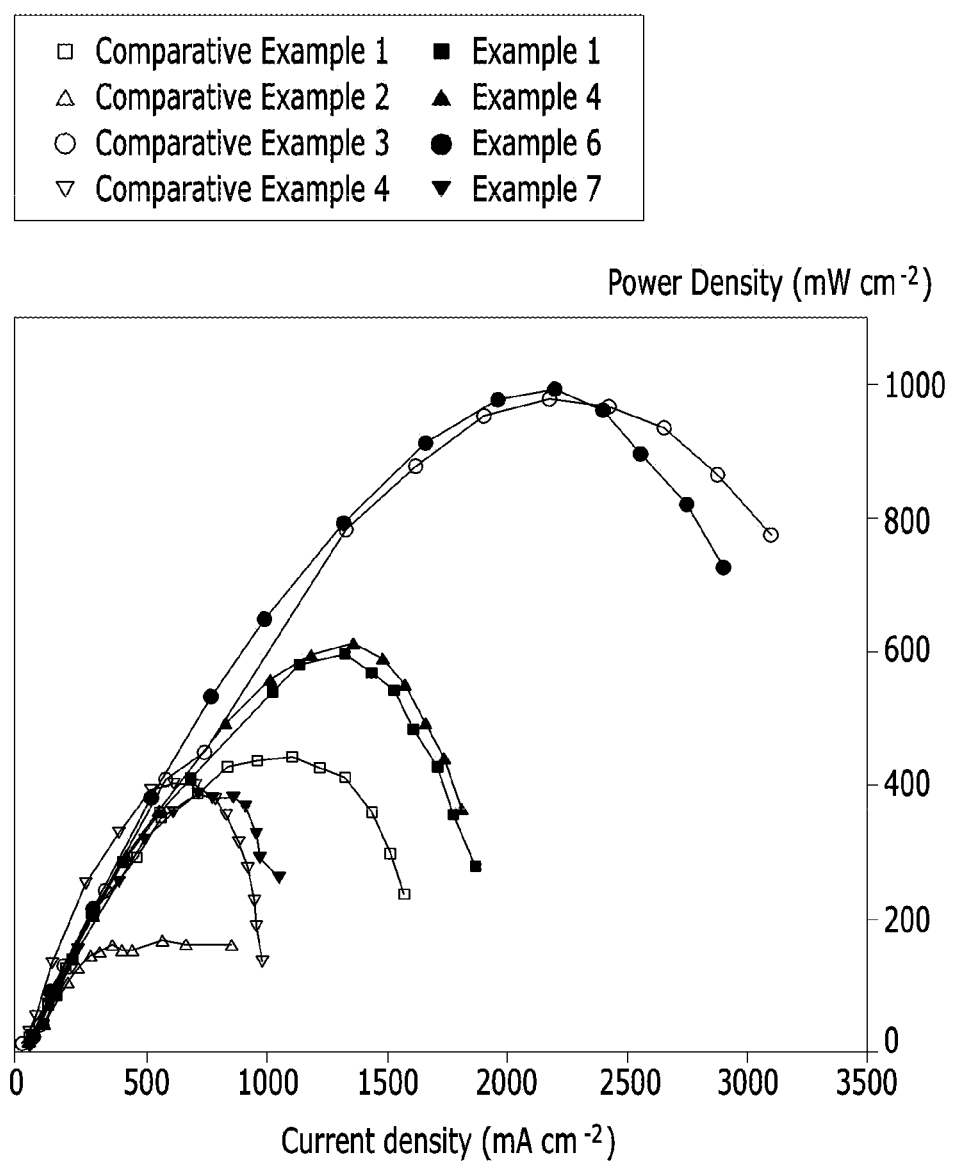
FIG. 26B is a graph showing power density of the polymer electrolyte membranes according to Examples 1, 4, 6 and 7 and Comparative Examples 1 to 4 under relative humidity of 85% at 85° C.

Furthermore, current density and power density of the polymer electrolyte membranes according to Example 1, 4, 6, and 7, and Comparative Examples 1 to 4, were measured under relative humidity condition of 100% at 80° C. and 1.5 atm, and the results are provided in FIGS. 25A and 25B, respectively. The current density and power density of the polymer electrolyte membranes according to Example 1, 4, 6, and 7, and Comparative Examples 1 to 4, were measured under relative humidity condition of 85% at 100° C. and 1.5 atm, and the results are provided in FIGS. 26A and 26B, respectively. The current density and power density of the polymer electrolyte membranes according to Example 1, 4, 6, and 7, and Comparative Examples 1 to 4, were measured under relative humidity condition of 35% at 120° C. and 1.5 atm, and the results are provided in FIGS. 27A and 27B, respectively.

As shown in FIGS. 24A to 27B, the polymer electrolyte membrane obtained by a hydrophobic treatment showed excellent current density and power density.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:
1. A polymer ion exchange membrane for a polymer electrolyte membrane fuel cell comprising:
a nano-crack hydrophobic thin coating layer of a 1 nm to 1000 nm thickness formed on a surface of a hydrocarbon-based proton conductive polymer membrane,
wherein the hydrocarbon-based proton conductive polymer membrane comprises a hydrocarbon-based polymer including a first repeating unit represented by the following Chemical Formula 1 and a second repeating unit represented by the following Chemical Formula 2:

[Chemical Formula 1]

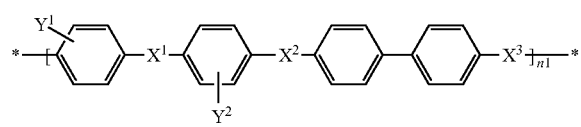

[Chemical Formula 2]

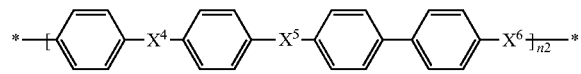

wherein,
$X^1$, $X^2$, $X^3$, $X^4$, $X^5$, and $X^6$ are the same or different from each other, and are $SO_2$ or O,
$Y_1$ and $Y_2$ are $SO_3H$ or $SO_3Na$,
n2 is 100-n1, and n1 is 30 to 70; or
a hydrocarbon-based polymer represented by the following Chemical Formula 3:

[Chemical Formula 3]

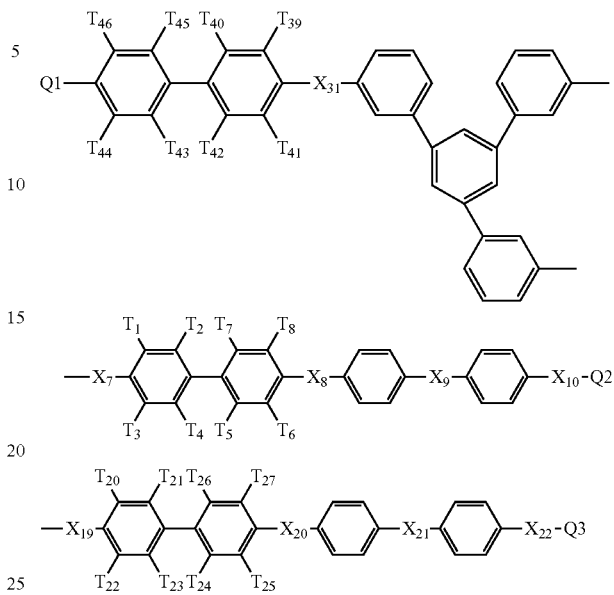

wherein,
Q1 is represented by Chemical Formula 3a,

[Chemical Formula 3a]

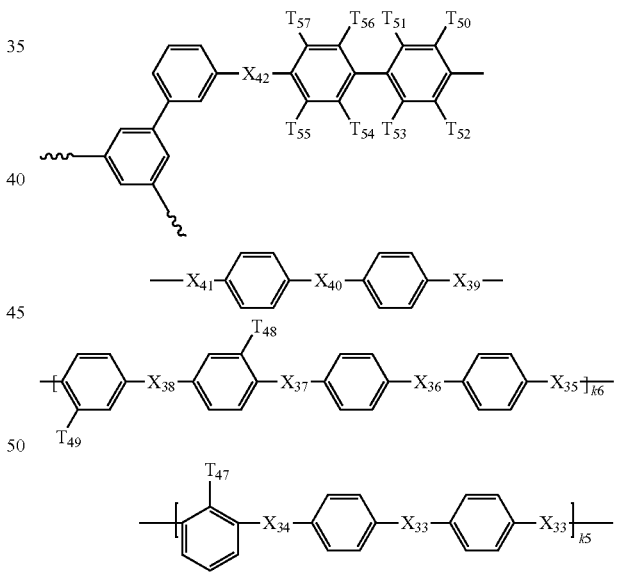

Q2 is represented by Chemical Formula 3b,

[Chemical Formula 3b]

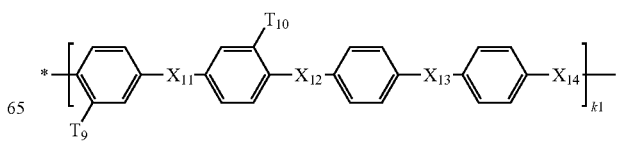

-continued

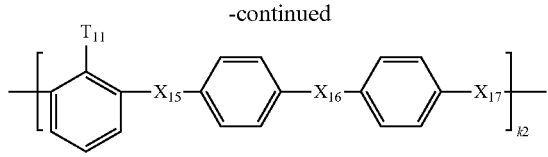

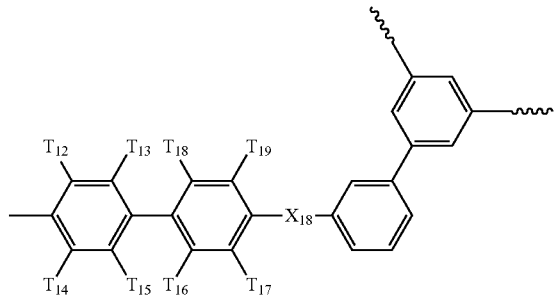

Q3 is represented by Chemical Formula 3c,

[Chemical Formula 3c]

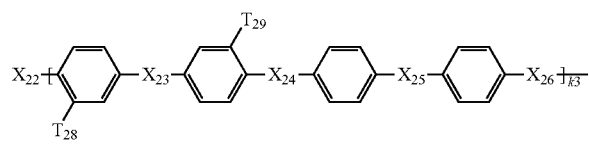

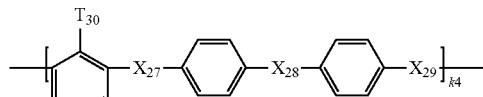

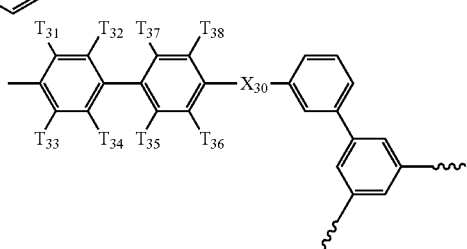

In Chemical Formulas 3a, 3b and 3c, $X^7, X^8, X^9, X^{10}, X^{12}, X^{13}, X^{14}, X^{15}, X^{16}, X^{17}, X^{18}, X^{19}, X^{20}, X^{21}, X^{22}, X^{24}, X^{25}, X^{26}, X^{27}, X^{28}, X^{29}, X^{30}, X^{31}, X^{32}, X^{33}, X^{34}, X^{35}, X^{36}, X^{37}, X^{39}, X^{40}, X^{41},$ and $X^{42}$ are the same or different from each other, and are S, O or $SO_2$, $X^{11}, X^{23}, X^{38}$ is sulfone (—$SO_2$—), $X^7, X^{18}, X^{19}, X^{30}, X^{31},$ and $X^{42}$ are ether linkage (—O—), $T^1, T^2, T^3, T^4, T^5, T^6, T^7, T^8, T^{12}, T^{13}, T^{14}, T^{15}, T^{16}, T^{17}, T^{18}, T^{19}, T^{20}, T^{21}, T^{22}, T^{23}, T^{24}, T^{25}, T^{26}, T^{27}, T^{31}, T^{32}, T^{33}, T^{34}, T^{35}, T^{36}, T^{37}, T^{38}, T^{39}, T^{40}, T^{41}, T^{42}, T^{43}, T^{44}, T^{45}, T^{46}, T^{50}, T^{51}, T^{52}, T^{53}, T^{54}, T^{55}, T^{56},$ and $T^{57},$ are the same or different from each other F, CN or $SO_3H$, $T^9, T^{10}, T^{28}, T^{29}, T^{48},$ and $T^{49},$ are sulfuric acid groups (—$SO_3H$), $T^9, T^{10}, T^{28}$ are nitrile groups (—CN), k1, k3, and k5 are the same or different from each other (hydrophilic part) and an integer of 0.4 to 0.6, and k2, k4, and k6 are 1-k1, 1-k3, and 1-k5 (hydrophobic part), which are the same or different from each other, and an integer of 0.6 to 0.4; or a hydrocarbon-based polymer represented by the following Chemical Formula 4:

[Chemical Formula 4]

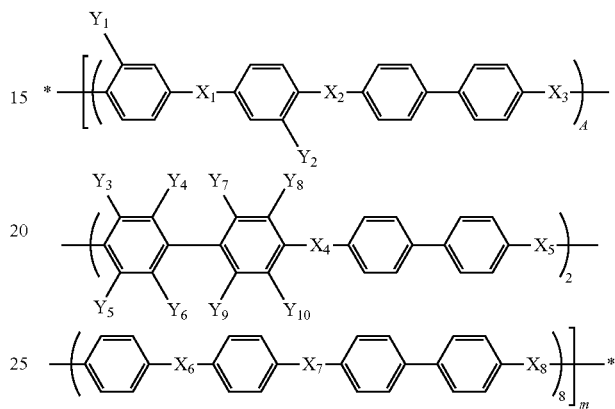

In the above Chemical Formula 4, $X_1, X_2, X_3, X_4, X_5, X_6, X_7$ and $X_8$ are the same or different from each other and are $SO_2$, or O, $Y_1$ and $Y_2$ are $SO_3H$ or $SO_3Na$, $Y_3, Y_4, Y_5, Y_6, Y_7, Y_8, Y_9,$ and $Y_{10}$ are F, A is an integer of 5 to 30, and B is an integer of 10 to 40, and wherein the nano-crack hydrophobic thin coating layer comprises a hydrophobic functional group such as $CF_2$, —$CF_3$, or a combination thereof, and the polymer electrolyte membrane fuel cell can be operated at high temperature of 120° C. and low humidity of 35% RH.

2. The polymer ion exchange membrane of claim 1, wherein the crack is 5 nm to 1000 nm deep and 5 nm to 500 nm wide.

3. The polymer ion exchange membrane of claim 1, wherein the polymer ion exchange membrane has a surface contact angle of greater than or equal to 70° and less than or equal to 180°.

4. The polymer ion exchange membrane of claim 1, wherein the polymer ion exchange membrane has a surface contact angle of greater than or equal to 70° and less than or equal to 120°.

5. The polymer ion exchange membrane of claim 1, wherein the surface of the polymer ion exchange membrane shows peaks in bonding energy of 670 eV to 700 eV and 280 to 300 eV when X ray photoelectron spectroscopy is measured.

6. The polymer ion exchange membrane of claim 1, wherein the central portion of the polymer ion exchange membrane shows multiplet peak at 500 to 1500 $cm^{-1}$ when FT-IR is measured.

* * * * *